United States Patent
Takano et al.

(10) Patent No.: US 7,242,495 B2
(45) Date of Patent: Jul. 10, 2007

(54) IMAGE FORMING APPARATUS

(75) Inventors: Gaku Takano, Yokohama (JP); Hiroki Kanno, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 311 days.

(21) Appl. No.: 10/924,816

(22) Filed: Aug. 25, 2004

(65) Prior Publication Data

US 2005/0219629 A1 Oct. 6, 2005

Related U.S. Application Data

(63) Continuation of application No. 09/652,260, filed on Aug. 30, 2000, now Pat. No. 6,833,926.

(30) Foreign Application Priority Data

Sep. 28, 1999 (JP) .................................. 11-275301
Sep. 28, 1999 (JP) .................................. 11-275302

(51) Int. Cl.
*G06F 15/00* (2006.01)
(52) U.S. Cl. ............. 358/1.15; 358/1.13; 358/1.11
(58) Field of Classification Search ............. 358/1.1, 358/1.11, 1.12, 1.13, 1.15, 1.18, 1.2, 1.5, 358/1.14, 1.16, 1.17
See application file for complete search history.

(56) References Cited

U.S. PATENT DOCUMENTS

| 5,233,414 | A | | 8/1993 | Kojima |
| 5,404,477 | A | | 4/1995 | Jippo |
| 5,561,744 | A | * | 10/1996 | Sugaya et al. ............. 358/1.13 |
| 6,430,681 | B1 | | 8/2002 | Nagao |
| 6,833,926 | B1 | * | 12/2004 | Takano et al. ............. 358/1.15 |
| 2002/0003634 | A1 | * | 1/2002 | Kohno ....................... 358/1.13 |

FOREIGN PATENT DOCUMENTS

| JP | 470768 A | 3/1992 |
| JP | 6-233023 A | 8/1994 |
| JP | 6-314202 A | 8/1994 |

* cited by examiner

*Primary Examiner*—Thomas D. Lee
(74) *Attorney, Agent, or Firm*—Foley & Lardner LLP

(57) ABSTRACT

In an image processing apparatus, such as a digital color/monochromatic copying machine, for reading a color image or a monochromatic image and producing a copy image thereof, an image process section is composed of an arithmetic section which is programmed and operated by software, or image process programs. The image process programs are input from outside via an external interface and loaded in an external RAM. On the basis of input information from an operation panel, an optimal image process program is read out of the external RAM and loaded in an instruction RAM. The arithmetic section executes the image process program in the instruction RAM.

3 Claims, 18 Drawing Sheets

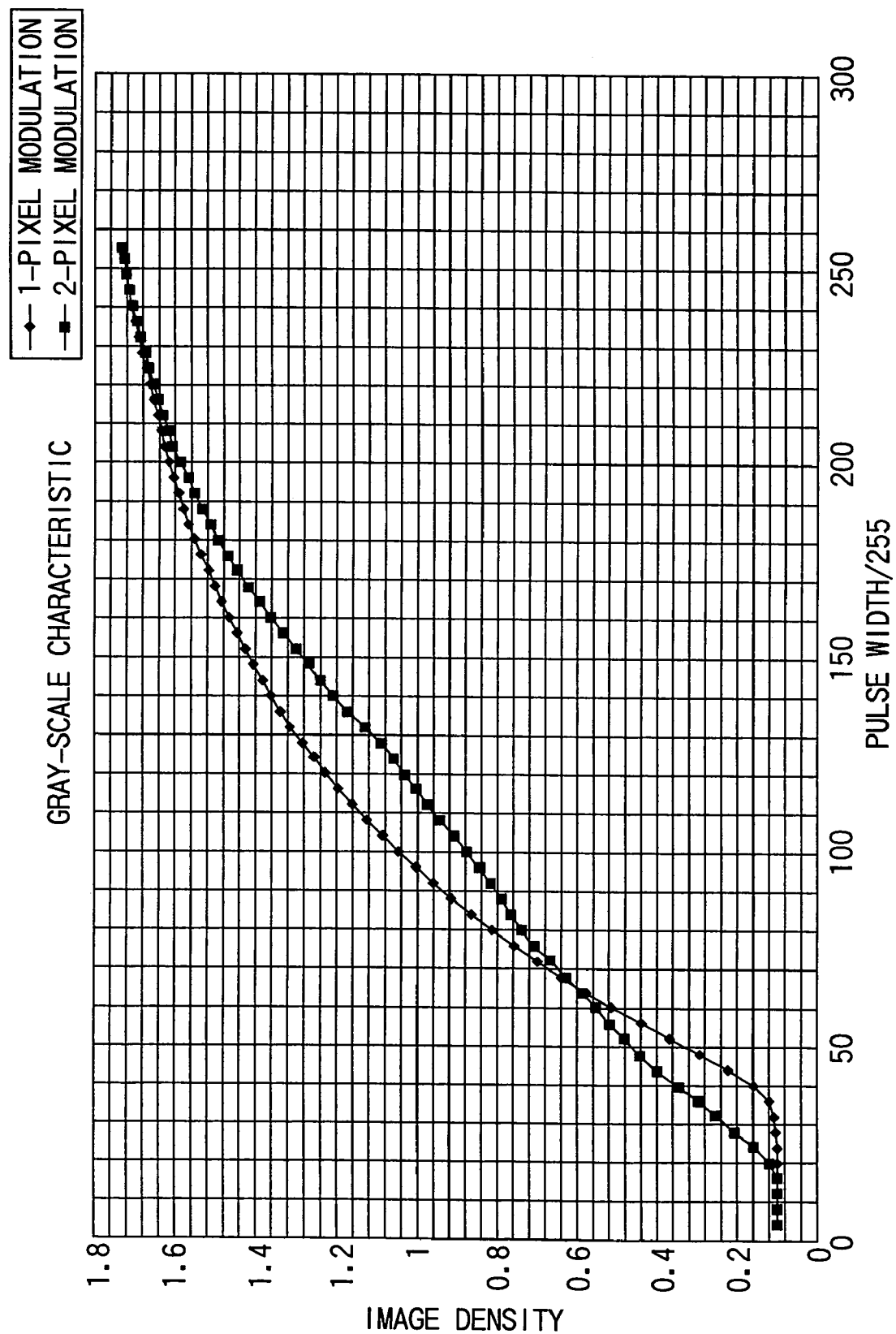

IMAGE FORMING APPARATUS

CROSS-REFERENCE TO RELATED APPLICATIONS

The present application is a continuation of U.S. application Ser. No. 09/652,260, filed Aug. 30, 2000 now U.S. Pat. No. 6,833,926, the entire contents of which are incorporated herein by reference.

This application is based upon and claims the benefit of priority from the prior Japanese Patent Applications No. 11-275301, Sep. 28, 1999; and No. 11-275302, Sep. 28, 1999, the entire contents of which are incorporated herein by reference.

BACKGROUND OF THE INVENTION

The present invention relates to an image processing apparatus such as a digital color copying machine, wherein an image of a color original is read and input by image input means such as a color scanner, the input image is subjected to a predetermined image process such as image-quality adjustment or edit processing, and the resultant image is output onto a paper sheet by image output means such as an electrophotographic color printer.

In general terms, the quality of a copy image is very important in an image processing apparatus such as a digital color/monochromic copying machine for reading a color image or a monochromic image and producing a copy image thereof.

In addition, a color/monochromic copying machine, in general, has not only an image copying function but also an extension image process function for performing various image editing such as adjustment of image quality or color or alteration of image shape.

Normally, an image process section for performing such an extension image process is constructed by a hardware logic such as an ASIC. However, because of the nature of hardware, lack of flexibility is a serious problem. For example, when a problem has occurred, there is no easy solution for it. Only specified algorithm parameters are realized. Image process algorithms meeting demands of individual users cannot be realized.

On the other hand, it is desired that a flexible image process be realized by constructing the image process section with use of an arithmetic process apparatus programmed and operated by software. In this case, however, the process speed is lower than in the case of using the hardware logic, and this is the most serious problem.

As a means for enhancing the process speed, there have been attempts to increase the speed of instruction fetch, by introducing high-speed memory devices. The high-speed memory devices, however, are expensive and it is difficult to mount a memory having a capacity enough to store all of various image process algorithms.

Under the circumstances, there is a demand for the advent of program loading means applicable to digital copying machines, which can load a proper program at a proper timing onto a small-capacity, high-speed memory device from some other memory device.

BRIEF SUMMARY OF THE INVENTION

An object of the present invention is to provide an image processing apparatus wherein an image process section is constructed by arithmetic means which is programmed and operated by software, whereby a flexible image process is realized.

Another object of the invention is to provide an image processing apparatus wherein an external interface is provided as a program loader-side element for loading a program onto a small-capacity, high-speed instruction memory, whereby an image process program can be upgraded and various parameters updated after shipment, and thus the image quality can be enhanced progressively.

Still another object of the invention is to provide an image processing apparatus capable of effectively using a small-capacity, high-speed memory device by loading thereon a proper image process program alone.

In order to achieve the above objects, according to an aspect of the present invention, there is provided an image processing apparatus comprising:

image input means for inputting image data on an original;

image process means for subjecting the image data input by the image input means to a predetermined image process;

first program storage means for storing an image process program for performing the image process to be executed by the image process means;

image output means for outputting the image data processed by the image process means;

program input means for inputting image process programs from outside;

second program storage means for storing the image process programs input by the program input means; and program loading means for reading out a desired image process program from the second program storage means on the basis of input information from outside, and loading the read-out desired image process program into the first program storage means.

According to another aspect of the invention, there is provided an image processing apparatus comprising:

image input means for inputting image data on an original;

image process means for subjecting the image data input by the image input means to a predetermined image process;

first program storage means for storing an image process program for performing the image process to be executed by the image process means;

image output means for outputting the image data processed by the image process means;

state detection means for detecting a state of the image output means;

program input means for inputting an optimal image process program from outside, on the basis of a detection result of the state detection means;

second program storage means for storing image process programs input by the program input means; and program loading means for reading out a desired image process program from the second program storage means on the basis of input information from outside, and loading the read-out desired image process program into the first program storage means.

According to still another aspect of the invention, there is provided an image processing apparatus comprising:

image input means for inputting image data on an original;

arithmetic means for subjecting the image data input by the image input means to a predetermined image process arithmetic operation;

first program storage means for storing an arithmetic program for performing the image process arithmetic operation to be executed by the arithmetic means;

image output means for outputting the image data processed by the arithmetic means;

second program storage means for prestoring arithmetic programs for performing the image process arithmetic operation; and program loading means for reading out a desired arithmetic program from the second program storage means on the basis of input information from outside, and loading the read-out desired arithmetic program into the first program storage means.

According to still another aspect of the invention, there is provided an image processing apparatus comprising:

image input means for inputting image data on an original;

arithmetic means for subjecting the image data input by the image input means to a predetermined image process arithmetic operation;

first program storage means for storing an arithmetic program for performing the image process arithmetic operation to be executed by the arithmetic means;

image output means for outputting the image data processed by the arithmetic means;

second program storage means for prestoring arithmetic programs for performing the image process arithmetic operation;

characteristic amount calculation means for calculating a characteristic amount of the image data input by the image input means; and program loading means for reading out an optimal one of the arithmetic programs from the second program storage means on the basis of input information from outside, and loading the optimal arithmetic program into the first program storage means.

According to still another aspect of the invention, there is provided an image processing apparatus comprising:

image input means with a plurality of scan modes, for inputting image data on an original according to said plurality of scan modes;

arithmetic means for subjecting the image data input by the image input means to a predetermined image process arithmetic operation;

first program storage means for storing an arithmetic program for performing the image process arithmetic operation to be executed by the arithmetic means;

image output means for outputting the image data processed by the arithmetic means;

second program storage means for prestoring arithmetic programs for performing the image process arithmetic operation; and program loading means for reading out an optimal one of the arithmetic programs from the second program storage means in accordance with the scan mode of the image input means, and loading the optimal arithmetic program into the first program storage means.

According to still another aspect of the invention, there is provided an image processing apparatus comprising:

image input means for inputting image data on an original;

arithmetic means for subjecting the image data input by the image input means to a predetermined image process arithmetic operation;

first program storage means for storing an arithmetic program for performing the image process arithmetic operation to be executed by the arithmetic means;

image output means for outputting the image data processed by the arithmetic means;

state detection means for detecting a state of the image output means;

second program storage means for prestoring arithmetic programs for performing the image process arithmetic operation; and program loading means for reading out a desired arithmetic program from the second program storage means on the basis of a detection result of the state detection means, and loading the read-out desired arithmetic program into the first program storage means.

According to still another aspect of the invention, there is provided an image processing apparatus comprising:

image input means for inputting image data on an original;

arithmetic means for subjecting the image data input by the image input means to a predetermined image process arithmetic operation;

first program storage means for storing an arithmetic program for performing the image process arithmetic operation to be executed by the arithmetic means;

image output means for outputting the image data processed by the arithmetic means; second program storage means for prestoring arithmetic programs for performing the image process arithmetic operation;

first program loading means for reading out a desired arithmetic program from the second program storage means on the basis of input information from outside, and loading the read-out desired arithmetic program into the first program storage means;

frequency-of-use data storage means for storing data on frequency of use of the arithmetic programs stored in the second program storage means; and second program loading means for reading out an arithmetic program with a high frequency of use from the second program storage means on the basis of the frequency-of-use data stored in the frequency-of-use data storage means, and loading the read-out arithmetic program into the first program storage means.

According to still another aspect of the invention, there is provided an image processing apparatus comprising:

image input means for inputting image data on an original;

arithmetic means for subjecting the image data input by the image input means to a predetermined image process arithmetic operation;

first program storage means for storing an arithmetic program for performing the image process arithmetic operation to be executed by the arithmetic means;

image output means for outputting the image data processed by the arithmetic means;

second program storage means for prestoring arithmetic programs for performing the image process arithmetic operation;

program loading means for reading out a desired arithmetic program from the second program storage means on the basis of input information from outside, and loading the read-out desired arithmetic program into the first program storage means; and display means for displaying information stored in the first program storage means and the second program storage means on the basis of instruction information input from outside.

According to still another aspect of the invention, there is provided an image processing apparatus comprising:

image input means for inputting image data on an original;

arithmetic means for subjecting the image data input by the image input means to a predetermined image process arithmetic operation;

first program storage means for storing an arithmetic program for performing the image process arithmetic operation to be executed by the arithmetic means;

image output means for outputting the image data processed by the arithmetic means;

second program storage means for prestoring arithmetic programs for performing the image process arithmetic operation;

program loading means for reading out a desired arithmetic program from the second program storage means on the basis of input information from outside, and loading the read-out desired arithmetic program into the first program storage means;

information visualizing means for visualizing information stored in the first program storage means and the second program storage means on the basis of instruction information input from outside; and recording means for recording on a recording medium the visualized information obtained from the information visualizing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 19 shows an example of an information record output visualized as an image by an internal information imaging section.

DETAILED DESCRIPTION OF THE INVENTION

Embodiments of the present invention will now be described with reference to the accompanying drawings.

To begin with, a first embodiment of the invention will be described.

Figure 1:
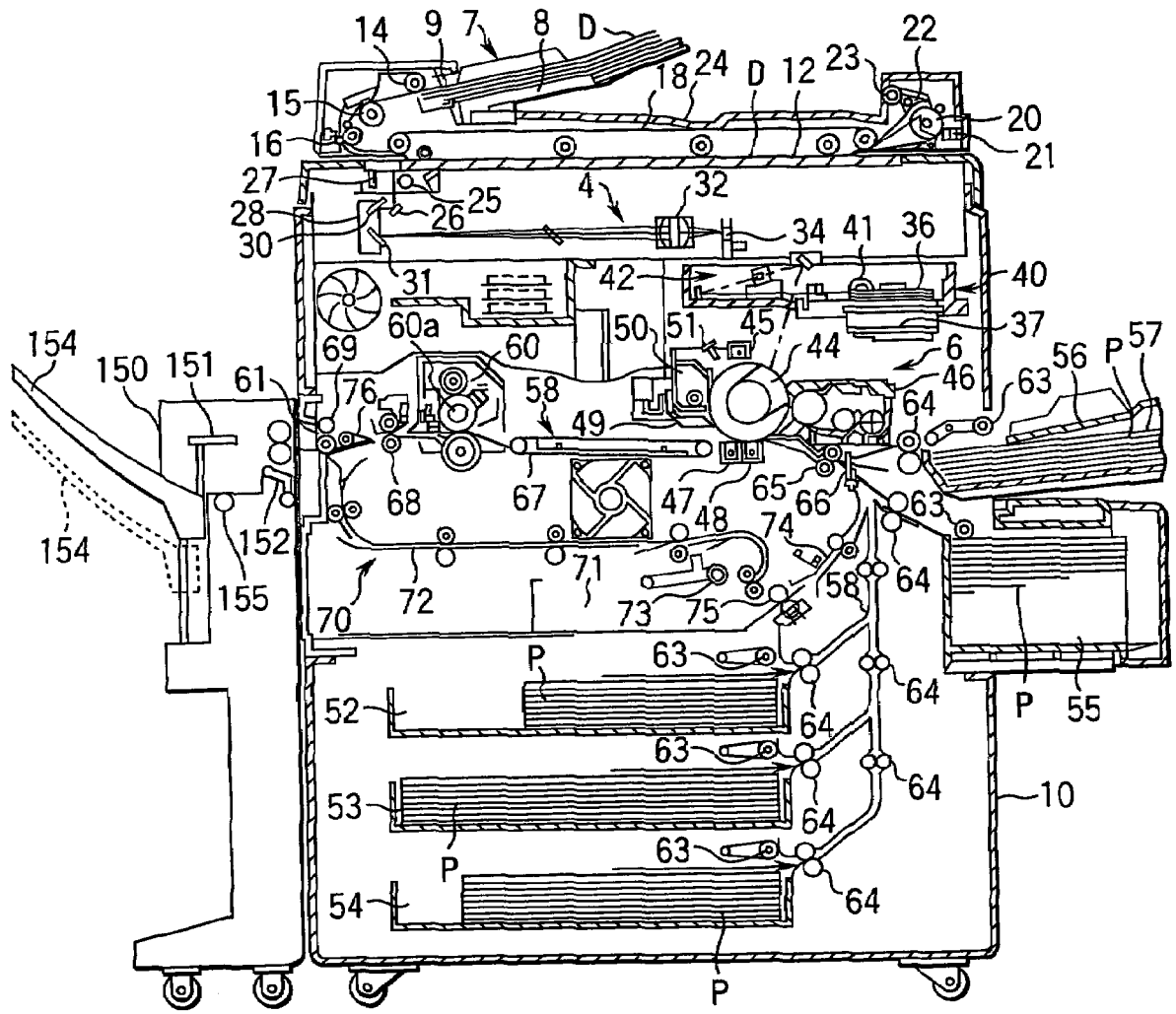
FIG. 1 is a side view schematically showing an internal structure of an image processing apparatus, such as a digital color copying machine, according to an embodiment of the present invention.

FIG. 1 is a side view schematically showing an internal structure of a digital copying machine, which is an example of the image processing apparatus according to the present invention. This digital copying machine is, for example, a composite-type copying machine having three functions of a copying machine, a facsimile, and a printer.

In FIG. 1, the digital copying machine has an apparatus main body 10. The apparatus main body 10 incorporates a scanner section 4 functioning as an image input means and a printer section 6 functioning as an image output means.

An original table 12 formed of transparent glass, on which a read object, i.e. an original D is placed, is disposed on the upper surface of the apparatus main body 10. An automatic document feeder 7 (hereinafter referred to as "ADF") for automatically feeding originals onto the original table 12 is disposed on the upper surface of the apparatus main body 10. The ADF 7 is disposed to be opened/closed with respect to the original table 12 and serves as an original cover for bringing the original D placed on the original table 12 into close contact with the original table 12.

The ADF 7 has an original tray 8 on which the original D is set; an empty sensor 9 for detecting the presence/absence of originals; pickup rollers 14 for picking up originals on the original tray 8 one by one; a feed roller 15 for conveying the picked-up original; an aligning roller pair 16 for aligning the leading edges of the originals; and a conveyor belt 18 disposed to cover almost the entire surface of the original table 12. A plurality of originals set on the original tray 8 with their surfaces facing up are sequentially taken out from the lowermost page, i.e. the last page, aligned by the aligning roller pair 16, and conveyed to a predetermined position on the original table 12 by the conveyor belt 18.

In the ADF 7, a reversing roller 20, a non-reverse sensor 21, a flapper 22 and a delivery roller 23 are disposed at the end portion on the opposite side of the aligning roller pair 16 with respect to the conveyor belt 18. The original D whose image information has been read by the scanner section 4 (to be described later) is fed from the original table 12 by the conveyor belt 18 and delivered to an original delivery section 24 on the ADF 7 through the reversing roller 20, flapper 21 and delivery roller 22. To read the lower surface of the original D, the flapper 22 is switched. The original D conveyed by the conveyor belt 18 is reversed by the reversing roller 20 and fed to a predetermined position on the original table 12 again by the conveyor belt 18.

The scanner section 4 provided in the apparatus main body 10 has an exposure lamp 25 as a light source for illuminating the original D placed on the original table 12, and a first mirror 26 for deflecting reflection light from the original D in a predetermined direction. The exposure lamp 25 and first mirror 26 are attached to a first carriage 27 disposed under the original table 12.

The first carriage 27 is disposed to be movable in parallel to the original table 12 and reciprocally moved under the original table 12 by a scanning motor 35 (to be described later) through a toothed belt (not show), etc.

A second carriage 28 movable in parallel to the original table 12 is disposed under the original table 12. Second and third mirrors 30 and 31 for sequentially deflecting reflection light from the original D, which has been deflected by the first mirror 26, are attached to the second carriage 28 at right angels with each other. The second carriage 28 is moved by, e.g. the toothed belt for driving the first carriage 27 along with the first carriage 27, and moved in parallel along the original table 12 at half the speed of the first carriage.

A focusing lens 32 for focusing reflection light from the third mirror 31 mounted on the second carriage 28, and a CCD line sensor 34 serving as photoelectric conversion means for receiving the reflected light focused by the focusing lens and photoelectrically converting it are also disposed under the original table 12. The focusing lens 32 is disposed in a plane including the optical axis of the light deflected by the third mirror 31 so as to be movable by means of a driving mechanism. The focusing lens 32 moves to focus the reflection light at a desired magnification. The line sensor 34 photoelectrically converts the incoming reflection light and outputs an electrical signal corresponding to the read original D.

On the other hand, the printer section 6 has a laser exposure unit 40 functioning as a latent image forming means. The laser exposure unit 40 comprises a semiconductor laser 41 as a light source; a polygon mirror 36 as a scanning member for continuously reflecting a laser beam emitted by the semiconductor laser 41; a polygon motor 37 as a scanning motor for rotatably driving the polygon mirror 36 at a predetermined rotational speed (to be described later); and an optical system 42 for deflecting the laser beam from the polygon mirror and guiding the beam to a photosensitive drum 44 (to be described later). The laser exposure unit 40 with the above structure is fixed to a support frame (not shown) of the apparatus main body 10.

The semiconductor laser 41 is ON/OFF-controlled in accordance with the image information of the original D read by the scanner section 4 or facsimile transmission/reception document information. The laser beam is directed to the photosensitive drum 44 through the polygon mirror 36 and optical system 42 to scan the outer surface of the photosensitive drum 44, thereby forming an electrostatic latent image on the outer peripheral surface of the photosensitive drum 44.

The printer section 6 has the rotatable photosensitive drum 44 as an image carrier disposed almost at the center of the apparatus main body 10. The outer peripheral surface of the photosensitive drum 44 is exposed to the laser beam from the laser exposure unit 40, and so a desired electrostatic latent image is formed thereon. Around the photosensitive drum 44, the following elements are arranged in the named order: a charger 45 for electrifying the outer peripheral surface of the drum 44 with a predetermined charge; a developing device 46 for supplying toner as a developer to the electrostatic latent image formed on the outer peripheral surface of the photosensitive drum 44 to develop it at a desired image density; a separation charger 47 for separating an image formation medium, i.e. a copy paper sheet P, fed from a paper cassette (to be described later) from the photosensitive drum 44; a transfer charger 48 for transferring the toner image formed on the photosensitive drum 44 onto the paper sheet P; a separation gripper 49 for separating the copy paper sheet P from the outer peripheral surface of the photosensitive drum 44; a cleaning unit 50 for removing toner remaining on the outer peripheral surface of the photosensitive drum 44; and a discharger 51 for de-electrifying the outer peripheral surface of the photosensitive drum 44.

An upper sheet cassette 52, a middle sheet cassette 53 and a lower sheet cassette 54 which can be drawn out of the apparatus main body are stacked at the lower portion of the apparatus main body 10. These cassettes store copy paper sheets P of different sizes. A large-capacity feeder 55 is disposed on one side of these cassettes. This large-capacity feeder 55 stores about 3,000 copy paper sheets P having a size with high use frequency, e.g. copy paper sheets P with A4 size. A feed cassette 57 also serving as a manual feed tray 56 is detachably attached above the large-capacity feeder 55.

A convey path 58 extending from the sheet cassettes 52 to 54 and large-capacity feeder 55 through a transfer section located between the photosensitive drum 44 and transfer charger 48 is formed in the apparatus main body 10. A fixing unit 60 having a fixing lamp 60a is disposed at the end of the convey path 58. A delivery port 61 is formed in the side wall of the apparatus main body 10, which is opposed to the fixing unit 60. A single-tray finisher 150 is attached to the delivery port 61.

Pickup rollers 63 for extracting the paper sheets P one by one from the sheet cassette, 52, 53, 54, 57 or large-capacity feeder 55 are arranged near each of the upper sheet cassette 52, middle sheet cassette 53, lower sheet cassette 54 and feed cassette 57 and near the large-capacity feeder 55. A number of feed roller pairs 64 for conveying the copy paper sheet P extracted by the pickup rollers 63 through the convey path 58 are arranged in the convey path 58.

A registration roller pair 65 is arranged in the convey path 58 on the upstream side of the photosensitive drum 44. The registration roller pair 65 corrects a tilt of the extracted copy paper sheet P, registers the leading edge of the toner image on the photosensitive drum 44 and the leading edge of the copy paper sheet P, and feeds the copy paper sheet P to the transfer section at the same speed as the speed of movement of the outer peripheral surface of the photosensitive drum 44. A prealigning sensor 66 for detecting arrival of the copy paper sheet P is provided on the feed roller 64 side.

Each copy paper sheet P extracted from the sheet cassette, 52, 53, 54, 57 or large-capacity feeder 55 by the pickup rollers 63 is fed to the registration roller pair 65 by the feed roller pair 64. After the leading edge of the copy paper sheet P is aligned by the registration roller pair 65, the copy paper sheet P is fed to the transfer section.

In the transfer section, a development image, i.e. toner image formed on the photosensitive drum 44 is transferred onto the paper sheet P by the transfer charger 48. The copy paper sheet P on which the toner image has been transferred is separated from the outer peripheral surface of the photosensitive drum 44 by the function of the separation charger 47 and separation gripper 49 and conveyed to the fixing unit 60 through a conveyor belt 67 constituting part of the convey path 52. After the developer image is melted and fixed on the copy paper sheet P by the fixing unit 60, the copy paper sheet P is delivered onto the finisher 150 through the delivery port 61 by a feed roller pair 68 and a delivery roller pair 69.

An automatic double-side unit 70 for reversing the copy paper sheet P which has passed through the fixing unit 60 and feeding it to the registration roller pair 65 again is provided under the convey path 58. The automatic double-side unit 70 comprises a temporary stack 71 for temporarily stacking the copy paper sheets P; a reversing path 72 branched from the convey path 58 to reverse the copy paper sheet P which has passed through the fixing unit 60 and to guide the copy paper sheet P to the temporary stack 71; pickup rollers 73 for extracting the copy paper sheets P stacked on the temporary stack 71 one by one; and a feed roller 75 for feeding the extracted paper sheet to the registration roller pair 65 through a convey path 74. A selector gate 76 for selectively distributing the copy paper sheets P to the delivery port 61 or reversing path 72 is provided at the branch portion between the convey path 58 and reversing path 72.

Where double-copying is performed, the copy paper sheet P which has passed through the fixing unit 60 is guided to the reversing path 72 by the selector gate 76, temporarily stacked on the temporary stack 71 in a reversed state, and fed to the registration roller pair 65 through the convey path 74 by the pickup rollers 73 and feed roller 75. The copy paper sheet P is registered by the registration roller pair 65 and fed to the transfer section again to transfer a toner image onto the reverse surface of the copy paper sheet P. Thereafter, the copy paper sheet P is delivered to the finisher 150 through the convey path 58, fixing unit 60 and delivery rollers 69.

The finisher 150 staples delivered copies of documents and stores them in units of a copy. Each time a copy paper sheet P to be stapled has been delivered from the delivery port 61, a guide bar 151 aligns the copy paper sheet P to the stapling side. When all paper sheets have been delivered, a copy of copy paper sheets P is pressed by a paper press arm 152 and stapled by a stapler unit (not shown).

Then the guide bar 151 moves downward. The stapled copy paper sheets P are delivered to a finisher delivery tray 154 by a finisher delivery roller 155 in units of a copy. The downward movement amount of the finisher delivery tray 154 is roughly determined in accordance with the number of copy paper sheets P to be delivered, and the finisher delivery tray 154 moves downward stepwise every time one copy is delivered. The guide bar 151 for aligning the delivered copy paper sheets P is located at such a high position that the guide bar 151 may not abut upon the already stapled copy paper sheets P placed on the finisher delivery tray 154.

The finisher delivery tray 154 is connected to a shift mechanism (not shown) which shifts (e.g. in four directions: front, rear, left and right sides) in units of a copy in the sort mode.

An operation panel 80 (not shown) for inputting various copy conditions and a copy start signal for starting copying operation and displaying the operation state, etc. is provided at the upper portion on the front side of the apparatus main body 10.

Figure 2:
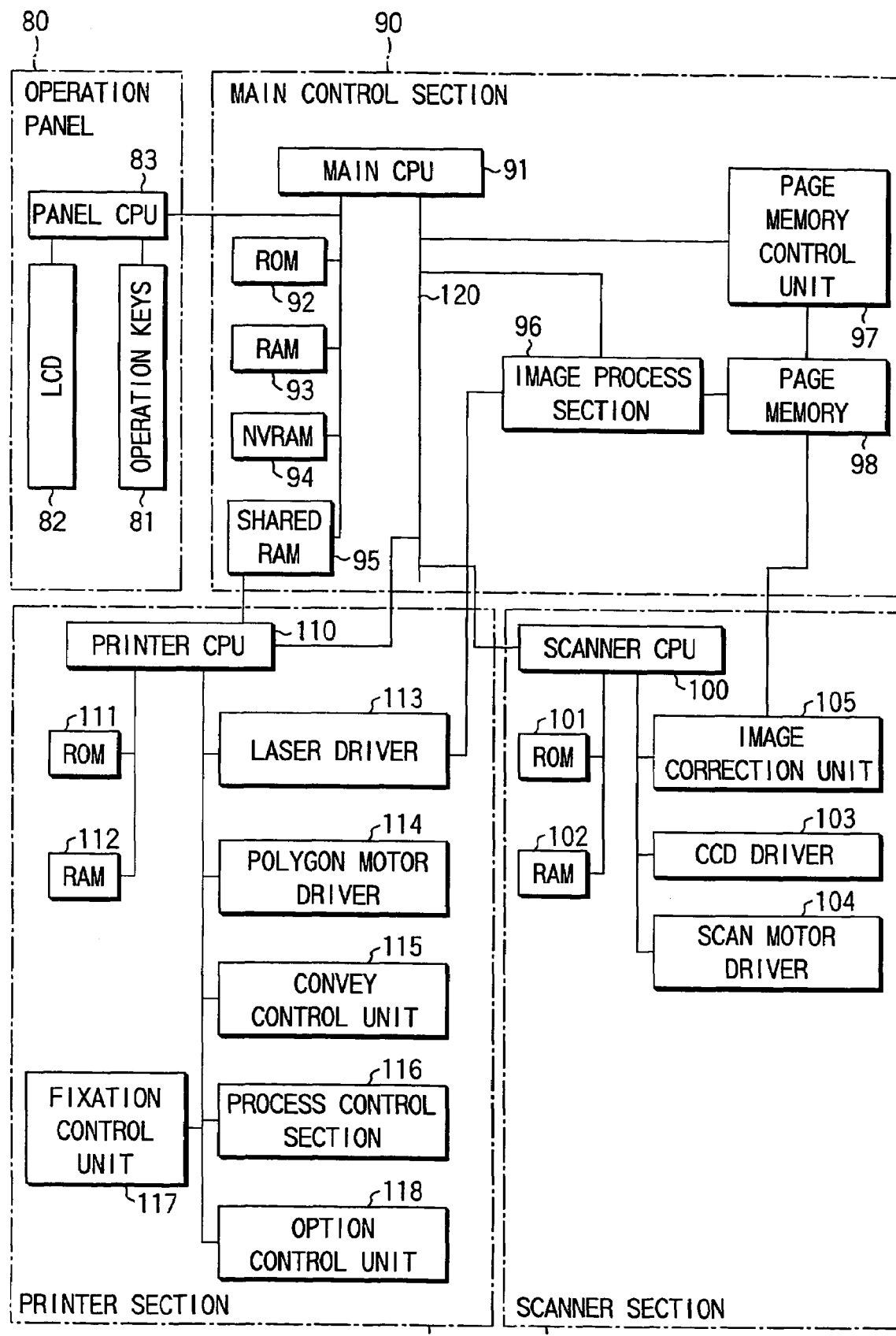
FIG. 2 is a block diagram schematically showing electrical connection of the image processing apparatus shown in FIG. 1 and flow of signals for control.

FIG. 2 is a block diagram schematically showing electrical connection of the image processing apparatus shown in FIG. 1 and flow of signals for control. In FIG. 2, a control system comprises three CPUs (Central Control Units): a main CPU 91 provided in a main control section 90; a scanner CPU 100 in the scanner section 4; and a printer CPU 110 in the printer section 6. These CPUs are connected by a shared bus 120.

The main CPU 91 performs bi-directional communication with the printer CPU 110 via a shared RAM (Random Access Memory) 95. The main CPU 91 issues an operational instruction, and the printer CPU 110 returns status data. Serial communication is performed between the printer CPU 110 and scanner CPU 100. The printer CPU 110 issues an operational instruction, and the scanner CPU 100 returns status data.

The shared bus 120 is a complete sync bus, like a PCI bus. In the shared bus 120, a single signal line is shared by an address bus and a data bus in a time-division manner. Program I/O transfer via the CPU is possible. In addition, a peripheral device may serve as a bus master for controlling the shared bus, and data transfer by the bus master, in which a memory, etc. are directly accessed, is possible.

An operation panel 80 comprises various operation keys 81, a liquid crystal display (LCD) 82, and a panel CPU 83 to which the LCD 82 and operation keys 81 are connected.

The main control section 90 comprises the main CPU 91, a ROM (Read-Only Memory) 92, a RAM 93, an NVRAM 94, shared RAM 95, an image process section 96, a page memory control unit 97, and a page memory 98.

The main CPU 91 controls the entirety of the main control section 90. The ROM 92 stores control programs, etc. for the main CPU 91. The RAM 93 temporarily stores various data.

The NVRAM (Non-Volatile RAM) 94 is a non-volatile memory backed up by a battery (not shown). Even when power is not supplied to the NVRAM 34, stored data is maintained.

The shared RAM 95 is used to perform bi-directional communication between the main CPU 91 and printer CPU 110.

The page memory control unit 97 stores and reads out image information in and from the page memory 98. The page memory 98 has areas capable of storing image information of a plurality of pages. The page memory 98 can store compressed data in units of a page, which is obtained by compressing image information from the scanner section 4.

The scanner section 4 comprises the scanner CPU 100 for controlling the entirety of the scanner section 4; a ROM 101 storing control programs, etc.; a data storage RAM 102; a CCD driver 103 for driving the line sensor 34; a scan motor driver 104 for controlling the rotation of a scan motor for moving the exposure lamp 25, mirrors 26, 27 and 28, etc.; and an image correction unit 105.

The image correction section 105 comprises an A/D converter for converting analog signals output from the line sensor 34 to digital signals; a shading correction circuit for correcting a variation in threshold level due to ambient temperature variation relative to the output signal from the line sensor 34; and a line memory for temporarily storing shading-corrected digital signals from the shading correction circuit.

The printer section 6 comprises the printer CPU 110 for controlling the entirety of the printer section 6; a ROM 111 storing control programs, etc.; a data storage RAM 112; a laser driver 113 for driving the semiconductor laser 41; a polygon motor driver 114 for driving the polygon motor 37 of the laser exposure unit 40; a convey control unit 115 for controlling conveyance of the sheet P by the convey mechanism 58; a process control section 116 for controlling charging, developing and transferring processes using the charging device 45, developing device 46 and transfer charger 48; a fixation control unit 117 for controlling the fixing device 60; and an option control unit 118 for control options.

The image correction section 105, page memory 98, image process section 96 and laser driver 113 are serially connected, and image data flows through these elements in the named order. It is possible, however, to let image data flow from the image correction section 105 to the image process section 96, without storing it in the page memory 98.

Figure 3:
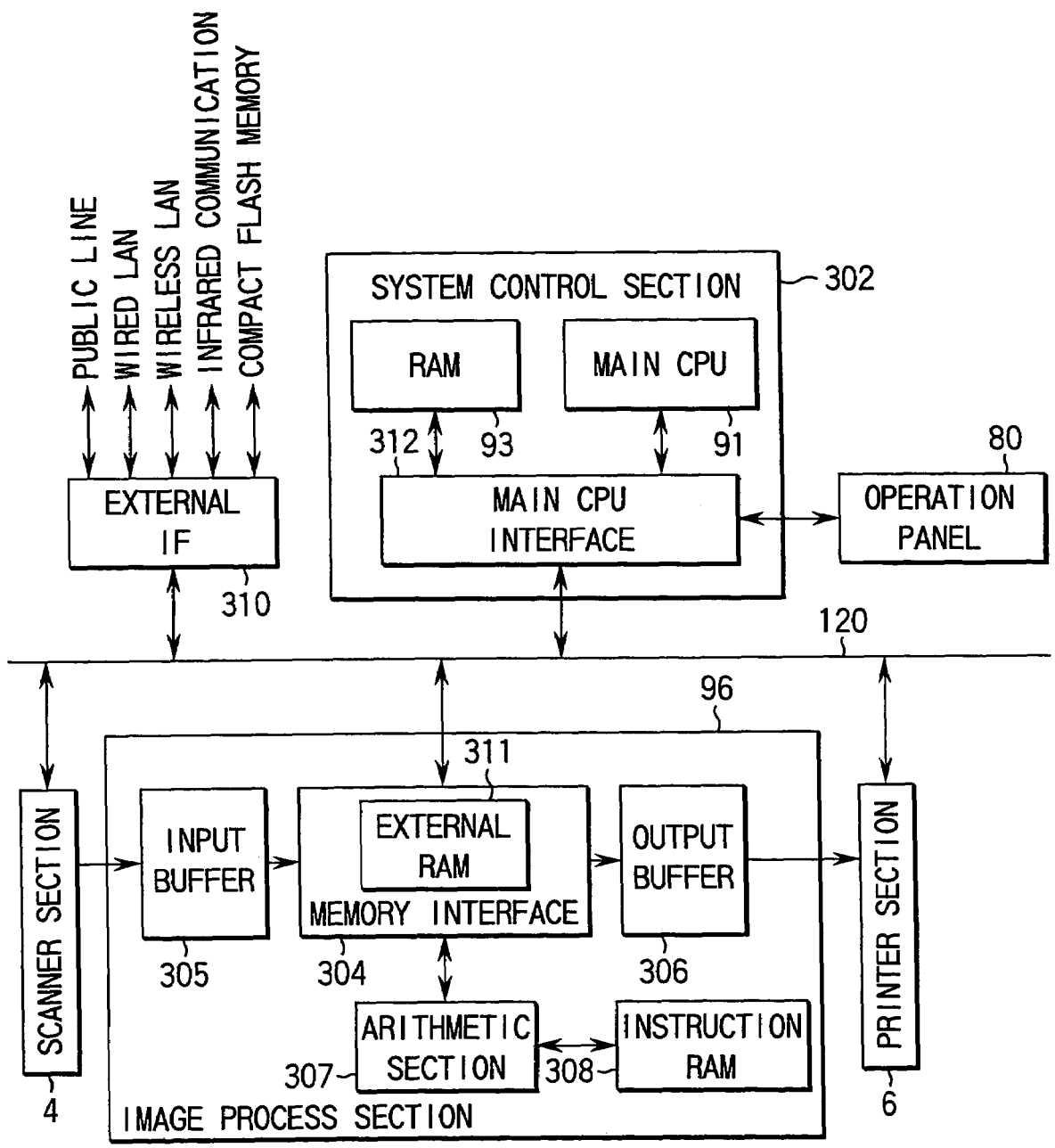
FIG. 3 is a block diagram showing in detail the structure of an image process section and peripheral elements thereof according to a first embodiment of the invention.

FIG. 3 is a block diagram showing in detail the structure of the image process section 96 and peripheral elements thereof. For the purpose of simpler description, the page memory control unit 97, page memory 98, etc. are omitted.

A system control section 302 includes the main CPU 91 and peripheral circuits thereof. The main CPU 91, RAM 93 and operation panel 80 are connected via a main CPU interface 312. The shared bus 120 can be accessed via the main CPU interface 312.

An external interface 310 is connected to the shared bus 120. The external interface 310 serves as an interface for input/output of data via the shared bus 120 between external lines or various storage media connected to the external interface 310, on the one hand, and the elements connected to the shared bus 120, on the other hand. In this context, the external lines include public lines such as telephone lines, wired LANs such as 100BASE-TX Ethernet, wireless LANs such as Bluetooth, and infrared communication such as IrDA, and the storage media include so-called compact flash memories and smart media.

The image process section 96 comprises a memory interface 304 incorporating an external RAM 311 as storage means, an input buffer 305, an output buffer 306, an arithmetic section 307, and an instruction RAM 308.

The memory interface 304 may be provided with storage means (e.g. hard disk) other than the RAM. In the present embodiment, however, it is assumed that the RAM is provided in the memory interface 304.

The arithmetic section 307 is a program-driven type arithmetic section generally called a CPU (Central Processing Unit). The arithmetic section 307 has a structure, for example, as shown in FIG. 4.

Figure 4:
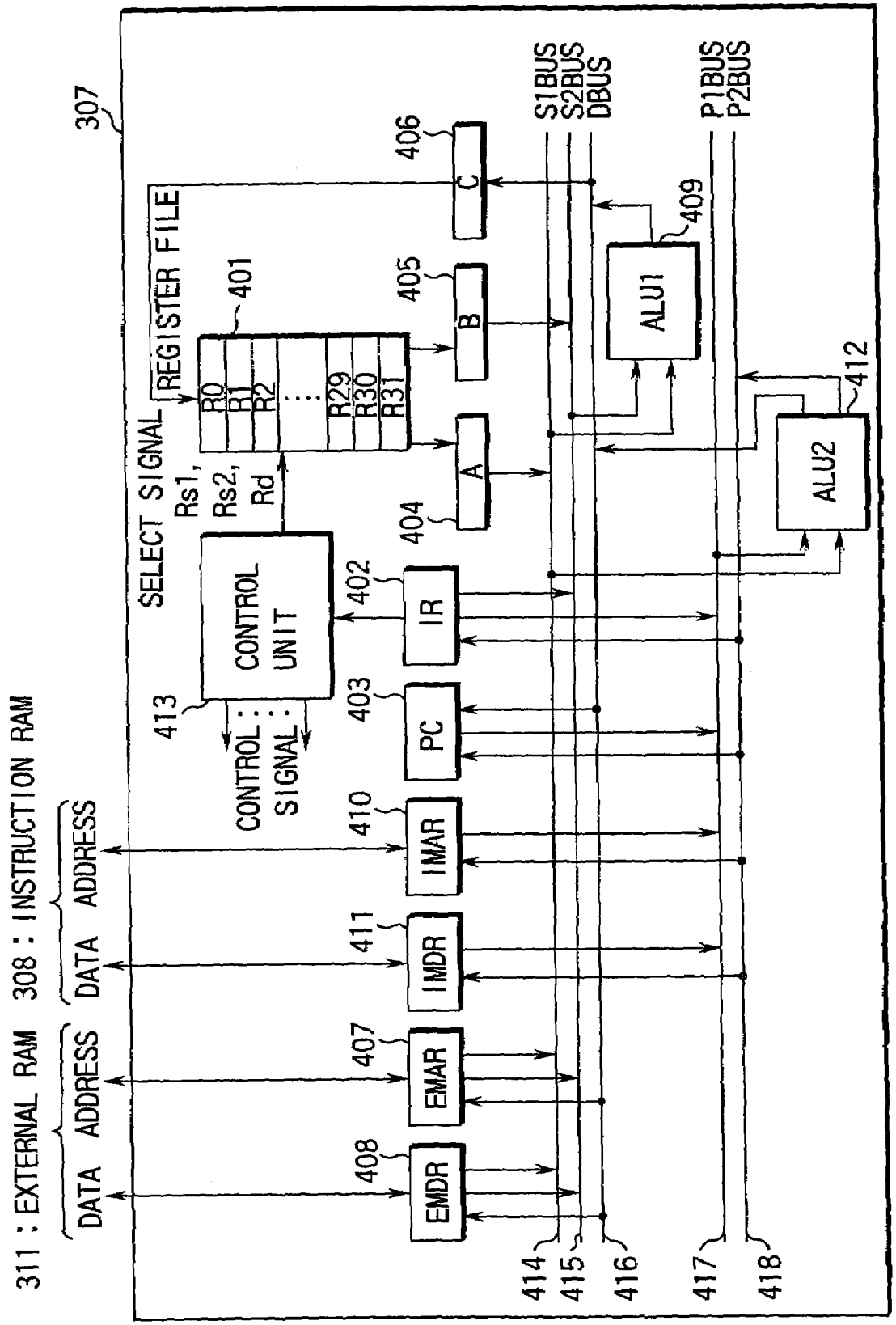
FIG. 4 is a block diagram sowing in detail the structure of an arithmetic section.

In FIG. 4, the arithmetic section 307 comprises a register file 401, an instruction register (IR) 402, a program counter (PC) 403, an arithmetic register (A) 404, an arithmetic register (B) 405, an arithmetic register (C) 406, an external RAM memory address register (EMAR) 407, an external RAM memory data register (EMDR) 408, an arithmetic logic unit (ALU1) 409, an instruction RAM memory address register (IMAR) 410, an instruction RAM memory data register (IMDR) 411, an arithmetic logic unit (ALU2) 412, and a control unit 413.

The register file 401 for operands comprises general-purpose registers R0 to R31 designated by instructions.

The instruction register (IR) 402 retains an instruction which is being currently executed.

The program counter (PC) 403 retains an address in the instruction RAM 308 which is to be executed next.

The arithmetic register (A) 404 retains a content of one source register (Rs1) in the register file 401.

The arithmetic register (B) 405 retains a content of the other source register (Rs2) in the register file 401.

The arithmetic register (C) 406 retains a content to be written in a destination register (Rd) in the register file 401.

The external RAM memory address register (EMAR) 407 retains a memory location address while a read/write operation for the external RAM 311 is being executed.

The external RAM memory data register (EMDR) 408 retains data to be transmitted between itself and the external RAM 311.

The arithmetic logic unit (ALU1) 409 executes basic arithmetic operations such as addition, subtraction, multiplication and division, and logic operations such as AND/OR.

The instruction RAM memory address register (IMAR) 410 retains a memory location address while a read/write operation for the instruction RAM 308 is being executed.

The instruction RAM memory data register (IMDR) 411 retains an instruction to be transmitted between itself and the instruction RAM 308.

The arithmetic logic unit (ALU2) 412, for example, loads an instruction retained in the register 411, which comes from the instruction RAM 308, into the instruction register 402 via connection of a P1 bus 417 and a P2 bus 418. Thus, the arithmetic logic unit (ALU2) 412 executes operations mainly for data read/write between the instruction RAM 308 and each register by bridging an S1 bus 414, P1 bus 417 and P2 bus 418.

The S1 bus 414 is an internal bus for data transfer, to which the arithmetic logic units 409 and 412 and the registers 404, 407 and 408 are connected. An S2 bus 415 is an internal bus for data transfer, to which the arithmetic logic unit 409 and the registers 402, 405, 407 and 408 are connected. A D bus 416 is an internal bus for data transfer, to which the arithmetic logic units 409 and 412, the program counter 403 and the registers 406, 407 and 408 are connected. The P1 bus 417 and P2 bus 418 are internal buses for data transfer, to which the arithmetic logic unit 412, the program counter 403 and the registers 402, 410 and 411 are connected.

The arithmetic logic units 409 and 412 operate in parallel. The arithmetic logic unit 412 executes an instruction fetch cycle, and the arithmetic logic unit 409 carries out an instruction execute cycle. In processes other than a branch process, the arithmetic logic unit 412 executes an instruction immediately preceding an instruction executed by the arithmetic logic unit 409. It is thus possible to avoid a problem of bottleneck on a bus, which will occur in a Neumann architecture using the same bus for instruction fetch and instruction execution. Accordingly, high-speed processing can be achieved.

Assume that an instruction length and a register length are each a 32-bit word.

An operation in the instruction fetch cycle will now be described.

In the instruction fetch cycle, a value in the program counter 403 provides a memory address in the instruction RAM 308. The value in the program counter 403 is loaded in the memory address register 410 via the P1 bus 417, arithmetic logic units 409 and 412 and P2 bus 418. After a delay depending on the access time of the instruction RAM 308, instruction data (assumed to be a 32-bit word) is loaded in the memory data register 411 via the memory data bus.

Next, the content in the memory data register 411 is loaded in the instruction register 402 via the P1 bus 417, arithmetic logic unit 412 and P2 bus 418.

Finally, in the instruction fetch cycle, the value of the program counter 403 is incremented by 4 in order to designate an address in the instruction RAM 308 for the next execute instruction.

The above operations are summarized as follows:

IMAR←PC
IR←IMDR
PC←PC+4.

An operation in the instruction execute cycle will now be described.

The steps in the instruction execute cycle depend on an instruction which is to be actually executed. In most cases, operands are taken out from the source registers Rs1 and Rs2 in the register file 401. The source registers Rs1 and Rs2 are selected by using register addresses designated by an instruction. The contents in the two source registers Rs1 and Rs2 are temporarily loaded in the arithmetic registers 404 and 405.

The above operations are summarized as follows:

A←Rs1
B←Rs2.

Assume that the register field is provided at the same location irrespective of the type of instruction. In the present embodiment, one source register is designated at the 16th bit to 20th bit, and another source register is designated at the 1st bit to 15th bit.

The subsequent steps depend on the type of instruction designated by operation codes. The operation codes are decoded by hardware in the control unit 413. The steps relating to main operation codes will now be described.

Arithmetic Logic Instruction Register-Register Type

In an arithmetic logic instruction "ADD R1, R2, R3" using three registers, a content of the arithmetic register 404 and a content of the arithmetic register 405 are transferred to the arithmetic logic unit 409 and subjected to an arithmetic logic operation. The operation result is transferred to the arithmetic register 406. The content of the arithmetic register 404 is transferred to the arithmetic logic unit 409 via the S1 bus 414. The content of the arithmetic register 405 is transferred to the arithmetic logic unit 409 via the S2 bus 415. The D2 bus 416 is used to transfer an output of the arithmetic logic unit 409 to the arithmetic register 406. The content of the arithmetic register 406 is copied to the destination register Rd in the register file 401.

The above operations are summarized as follows (";" indicates a simultaneous operation):

S1 bus←A; S2 bus←B
D bus←S1 bus<operation>S2 bus
C←D bus
Rd←C.

Arithmetic Logic Instruction Register-Constant Type

In an arithmetic logic instruction "ADD R1, R2, 44" using two registers and one constant, the operations differ from the above in that one of the sources is a constant retained at lower 16 bits following the instruction. That is, the constant is extracted from the lower 16 bits of the instruction register 402.

The above operations are summarized as follows:

S1 bus←A; S2 bus←IR (15-0 bits)
D bus←S1 bus<operation>S2 bus
C←D bus
Rd←C.

External RAM Memory Reference (Load/Store) Instruction

In the case of either a load instruction or a store instruction from the external RAM 311, the location address in the external RAM 311 is the sum of the source register Rs1 and the offset of lower 16 bits, as in "LD R1, 100[R2]" (the content of R2+100 address is copied to R1) or "ST R6, 200[R8]" (the content of R6 address is copied to R8+200 address). In this arithmetic operation, the arithmetic logic unit 409 is used, and the operation result is loaded in the memory address register 407. In the case of the load instruction, the content at the designated memory location is delivered to the arithmetic register 406 from the memory data register 408 via the arithmetic logic unit 409. The complete sequence is as follows:

EMAR←A+IR (15-0 bits)
C←EMDR
Rd←C.

The same applies to the store instruction, and the sequence is as follows:

EMAR←A+IR (15-0 bits)
EMDR←B.

Branch Instruction

In a branch instruction, true/false judgment of a condition designated by an instruction is performed. For example, in a case of "BEQ R2, R1, L1", if R2=R1, PC+L1. That is, the program counter 403 is offset using the arithmetic logic unit 409 by an amount of L1 corresponding to lower 16 bits of the instruction register 402. The sequence is as follows:

condition←A<operation>B
PC←PC+IR (15-0 bits)

Jump Instruction

A jump instruction is designated like "J100[R1]" and realized by loading "R1 content+100" in the program counter 403. The sequence is as follows:

PC←A<operation>IR (15-0 bits)

The basic operations of the arithmetic section 307 shown in FIG. 4 have been described. Unlike ordinary CPUs, the arithmetic section 307 has a function to be described below and, even if the capacity of the instruction RAM 308 is small, various image processes can be performed. This function is a program load function for loading programs from the external RAM 311 to the instruction RAM 308. The sequence of this function will now be described in brief.

The instruction is described like "ILD R1, 100[R2]" (the content of external RAM R2+100 address is copied to instruction RAM R1 address). To start with, the following sequence is executed by the arithmetic logic unit 412:

A←Rd (in the example the content of R1 is loaded to register A)
IMAR←A.

In parallel with this, the following sequence is executed by the arithmetic logic unit 409:

B←Rs1 (in the example the content of R2 is loaded to register B)
EMAR←B+IR (15-0 bits).

Thereby, the memory content designated by the memory address register 407 is loaded from the external RAM 311 into the memory data register 408. Subsequently, the content of the memory data register 408 is loaded into the memory data register 411 by the arithmetic logic unit 412 via the S1 bus 414, arithmetic logic unit 412 and P2 bus 418:

IMDR←EMDR

After the loading is completed, the content of the memory data register 411 is loaded at the memory address indicated by the memory address register 410. By repeating this, programs are loaded from the external RAM 311 to the instruction RAM 308.

The store operation is executed in like manner. The instruction is described like "IST R6, 200[R8]" (the content of instruction RAM R6 address is copied to external RAM R8+200 address). To start with, the following sequence is executed by the arithmetic logic unit 409:

B←Rd (in the example the content of R8 is loaded to register B)
EMAR←B+IR (15-0 bits).

In parallel with this, the following sequence is executed by the arithmetic logic unit 412:

A←Rs1 (in the example the content of R6 is loaded to register A)

IMAR←A.

Subsequently, the instruction is read into the memory data register 411 from the address designated by the memory address register 410. The content of the memory data register 411 is copied to the memory data register 408 via the P1 bus 417, arithmetic logic unit 412 and D bus 416:

EMDR←IMDR

After the loading is completed, the content of the memory data register 408 is loaded at the memory address indicated by the memory address register 407. By repeating this, the content of the instruction RAM 308 is stored in the external RAM 311.

In the above, the arithmetic section 307 and the associated external RAM 311 and instruction RAM 308 have been described in general terms. The arithmetic section 307 can realize operation processes carried out by ordinary computers. Specifically, such operation processes include, for instance, image processes carried out by digital copying machines and printers:

preparation of histogram

γ-correction color conversion high-pass filter process low-pass filter process black-coloring (UCR, UCA) process gray-scale process (error diffusion process, structure dither process)

character/image discrimination.

Figure 5:
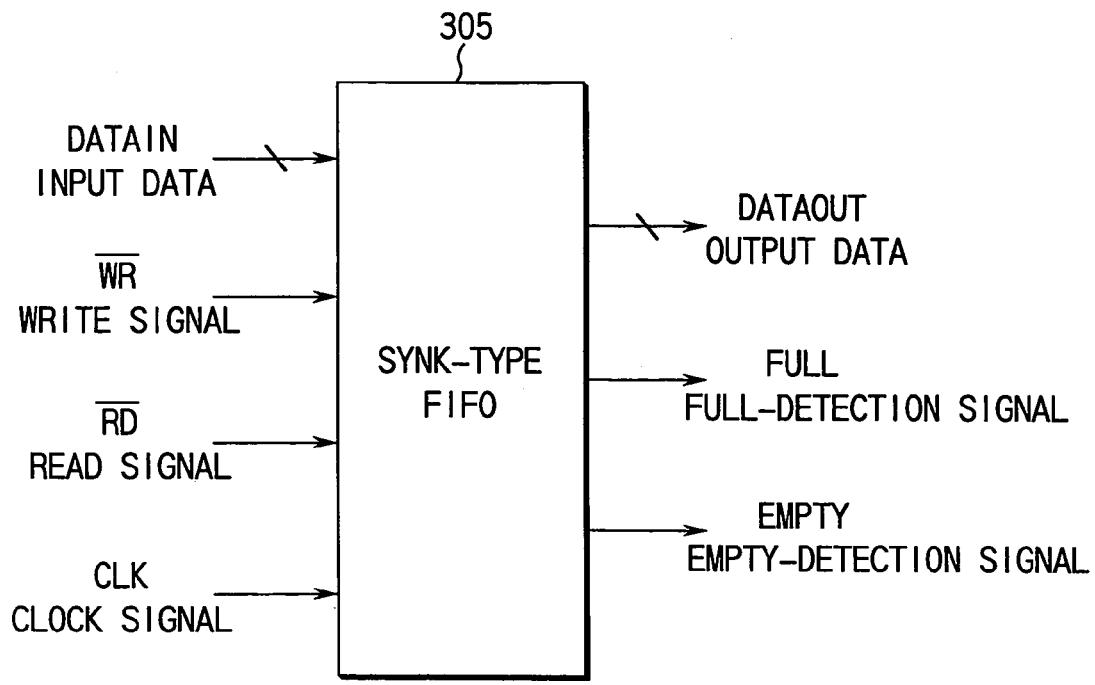
FIG. 5 is a block diagram showing an example of the structure of an input buffer.

The input buffer 305 is a sync-type FIFO, for example, as shown in FIG. 5. In response to a write signal WR from the scanner section 1, the input buffer 305 outputs a full-detection signal FULL indicating an internal state of the FIFO. When the FIFO is not full, the scanner section 4 delivers input data DATAIN into the FIFO, and the FIFO stores it. In addition, in response to a read-out signal RD from the memory interface 304, the input buffer 305 outputs an empty-detection signal EMPTY indicating an internal state of the FIFO. When the FIFO is not empty, the memory interface 304 reads out output data DATAOUT.

Figure 6:
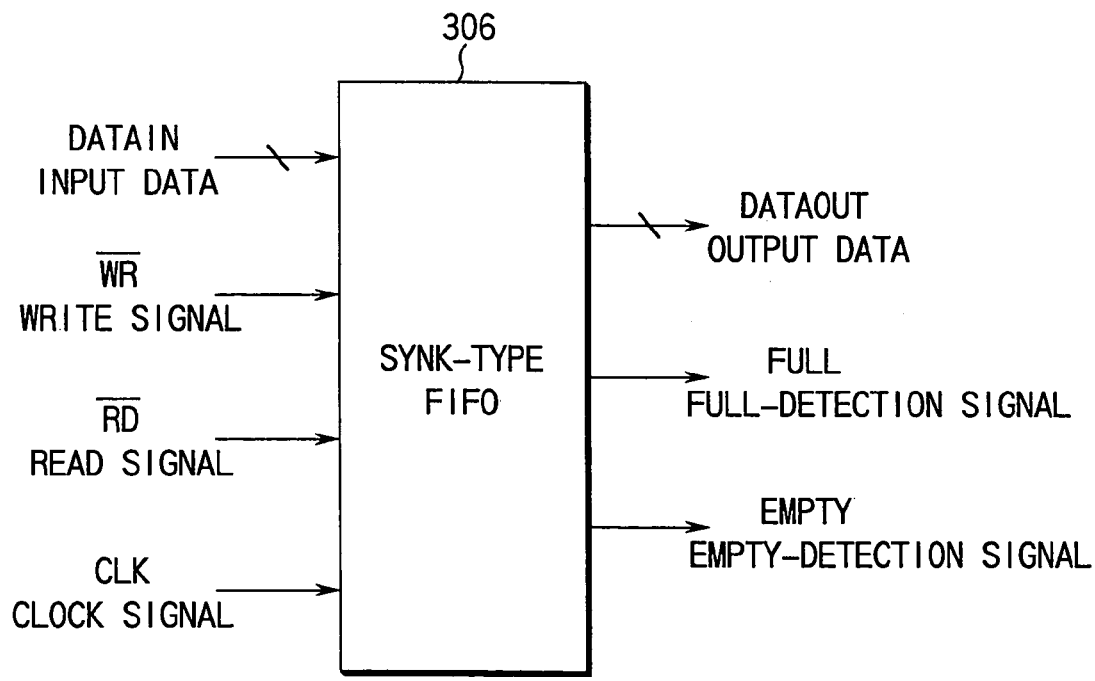
FIG. 6 is a block diagram showing an example of the structure of an output buffer.

On the other hand, the output buffer 306, like the input buffer 305, is a sync-type FIFO, for example, as shown in FIG. 6. In response to a write signal WR from the memory interface 304, the output buffer 306 outputs a full-detection signal FULL indicating an internal state of the FIFO. When the FIFO is not full, the memory interface 304 delivers input data DATAIN into the FIFO, and the FIFO stores it. In addition, in response to a read-out signal RD from the printer section 6, the output buffer 306 outputs an empty-detection signal EMPTY indicating an internal state of the FIFO. When the FIFO is not empty, the printer section 2 reads out output data DATAOUT (i.e. image data obtained after image processes).

The memory interface 304 is an interface connecting the input buffer 305, output buffer 306, a shared bus 120, and arithmetic section 307. The memory interface 304 incorporates the large-capacity external RAM 311.

The memory interface 304 outputs the read-out signal RD to the input buffer 305. If the input buffer 305 is not empty, the memory interface 304 reads out the image data from the input buffer 305 and stores the read-out image data at a predetermined address in the external RAM 311.

In addition, the memory interface 304 outputs the write signal WR to the output buffer 306. After confirming that the output buffer 306 is empty on the basis of the empty-detection signal EMPTY, the memory interface 304 outputs to the output buffer 306 the data stored at the predetermined address in the external RAM 311.

Furthermore, in response to a read-out control signal from the control unit 413, the memory interface 304 reads out data from the address location in the external RAM 311, which is designated by the address signal from the memory address register 407 in the arithmetic section 307. The memory interface 304 outputs the read-out data to the memory data register 408. Similarly, in response to a write control signal from the control unit 413, the memory interface 304 stores the content of the memory data register 408 from the address location in the external RAM 311, which is designated by the address signal from the memory address register 407 in the arithmetic section 307.

The external RAM 311 is connected to an address space of the shared bus 120 by a bus-master circuit in the memory interface 304. Thus, a read/write operation for the external RAM 311 can be performed from the shared bus 120.

Figure 7:
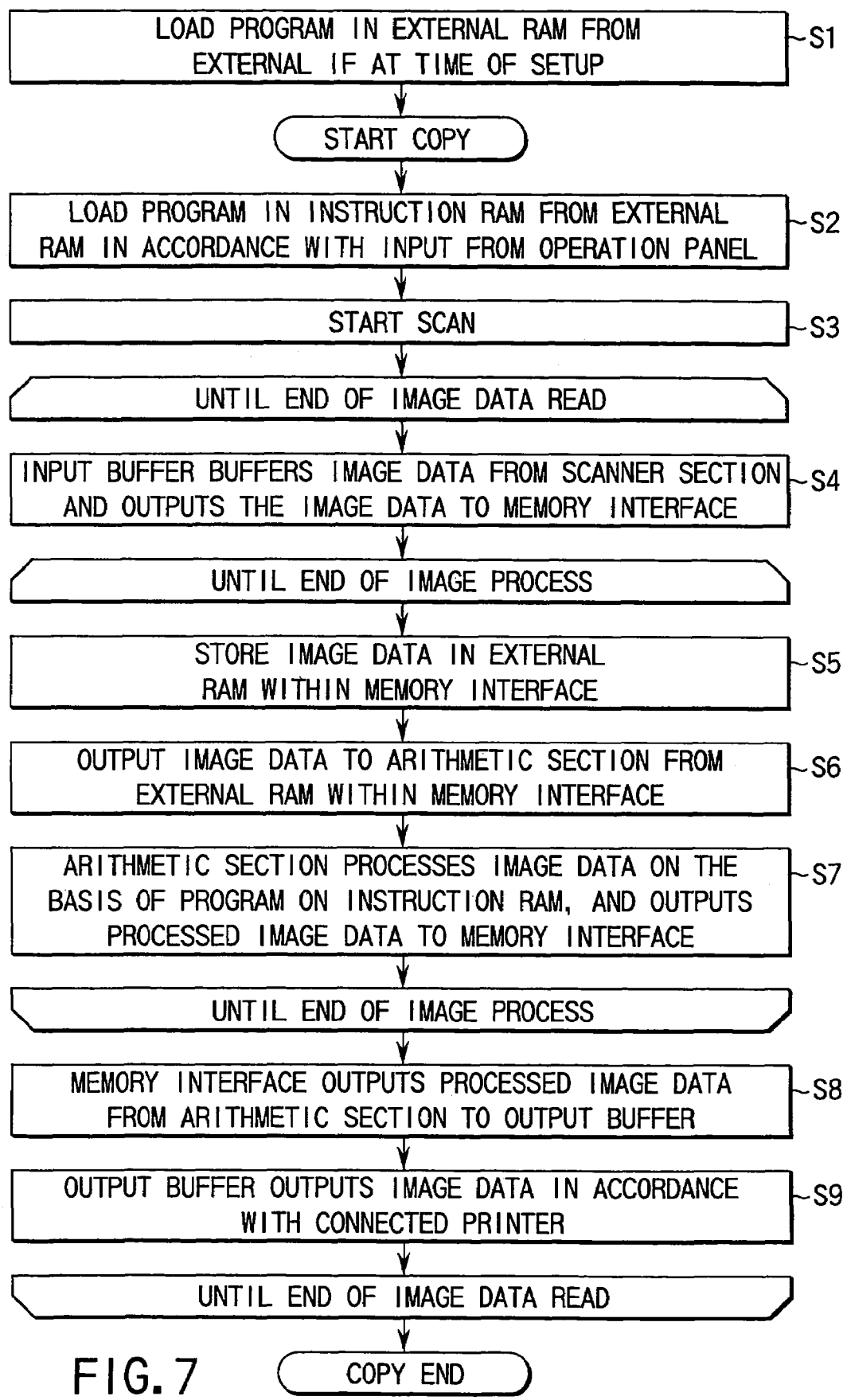
FIG. 7 is a flow chart illustrating an image process in the image process section according to the first embodiment.

The structure of the image process section 96 has been described above. The present invention is characterized in that a process illustrated in a flow chart of FIG. 7 is executed at the time of the copying operation by using the image process section 96. This process will now be described in brief.

When the apparatus is set up, an image process program for a copying function is input from the outside via the external interface 310, and this image process program is loaded in the external RAM 311 in the memory interface 304 of the image process section 96 (step S1).

With the copying operation started, the image process program stored in advance in the external RAM 311 in the memory interface 304 is selected in accordance with information input by the user through the operation panel 80. The selected image process program is loaded in the instruction RAM 308 via the arithmetic section 307 (step S2).

Upon the input of a process start instruction from the operation panel 80, the scanner section 4 starts reading the original (step S3). Image data acquired by the read operation of the scanner section 4 is buffered in the input buffer 305 and then output to the memory interface 304 (step S4). In the memory interface 304, the image data from the input buffer 305 is stored at a predetermined address position in the external RAM 311 (step S5). The external RAM 311 also stores arithmetic data used in the arithmetic section 307.

The memory interface 304 successively outputs the image data from the external RAM 311 in accordance with a read-out control signal from the arithmetic section 307 (step S6). The arithmetic section 307 processes the image data input from the memory interface 304 on the basis of the program on the instruction RAM 308 and returns the processed image data to the memory interface 304 (step S7).

In the memory interface 304, the processed image data output from the arithmetic section 307 is stored at a predetermined address in the external RAM 311.

From this address, the image data is output to the output buffer 306 (step S8). The output buffer 306 outputs the image data in accordance with the printer section 6 connected thereto (step S9).

An example of the information input by the user in step S2 will now be described. The LCD 82 on the operation panel 80 displays, for instance, three original mode switches for designating original modes of "CHARACTER/PHOTO ORIGINAL", "CHARACTER ORIGINAL" and "PHOTO ORIGINAL". At the time of executing the copying operation, the user selects one of them. Different image process programs are used for the respective original modes. In brief, the following programs are used:

Character/Photo Original: recognition→color conversion→filter process→black-coloring process→error diffusion process;

Character Original: color conversion→filter process→black-coloring process→error diffusion process; and Photo Original: color conversion→filter process→black-coloring process→structure dither process.

Where in step S2 the program corresponding to the original mode is not loaded in the instruction RAM 308 on the basis of this mode information, it is necessary to develop a program which will meet the conditions for the three original modes at the same time, and to load it in the instruction RAM 308. Normally, a high-speed operation memory is used for the instruction RAM 308. However, this memory is expensive and only a memory with a small capacity (e.g. 1024×32 bits) may practically be mounted. It is difficult to develop, with such a small-capacity memory, a program which will meet the conditions for the process speed and image quality in the three original modes. If such a program is to be executed, only a process of a greatest common measure may be realized and flexibility of a software process is not effectively used.

To solve this problem, in the present embodiment, three image process programs corresponding to the three original modes are prepared in advance in the external RAM 311. In step S2, one of the three image process programs, which corresponds to the original mode, is loaded in the instruction RAM 308 by the operation through the operation panel 80.

Since the whole area of the instruction RAM 308 can be used for each of the original modes, more complex programs can be executed, and the image processing with a satisfactory process speed and image quality can be performed.

The program loading from the external interface 310 in step S1 is not limited to the set-up of the apparatus, but it may be performed for grading-up of the image process program or customization of the image process program for the respective users. This function can enhance the flexibility of the image processing by software.

Other examples of software to be loaded are a color profile, a color conversion matrix, engine correction γ data, a program for improving image quality itself such as an intermediate gray-scale process program, a character discrimination program capable of processing, other than data, different languages for adjusting functions used by respective users, corporation ID color correction (in most cases a record color is specified for a corporation ID, and the record color is recognized by character recognition and color correction is executed), automatic header/footer setting, etc.

A second embodiment of the present invention will now be described.

Figure 8:
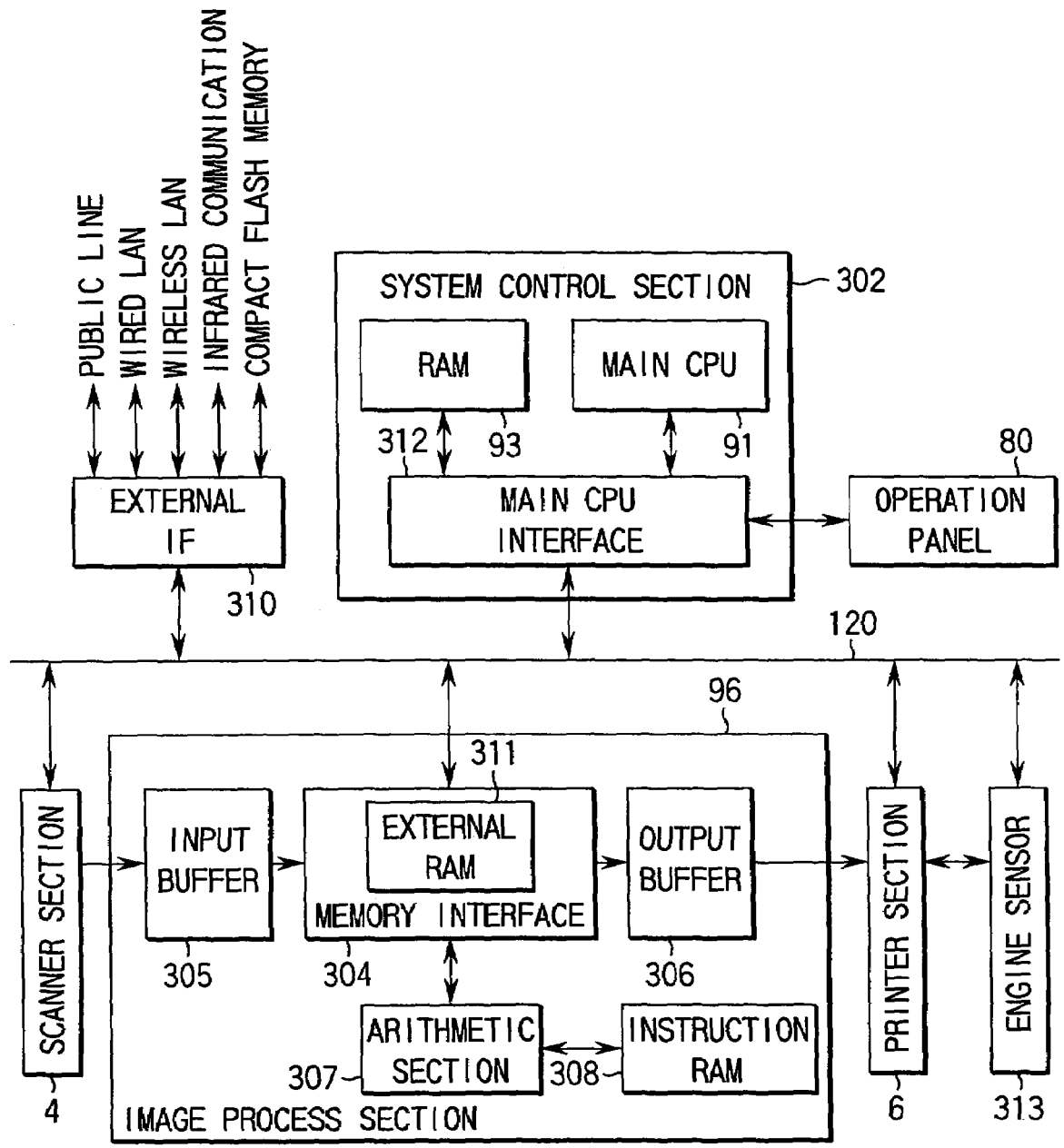
FIG. 8 is a block diagram showing in detail the structure of an image process section and peripheral elements thereof according to a second embodiment of the invention.

The second embodiment of the invention differs from the first embodiment in that an engine sensor 313 serving as a state sensing means for sensing the engine state of the printer section 6 is additionally provided, as shown in FIG. 8. In the other respects the second embodiment is common to the first embodiment, and a description of the common parts may be omitted.

The second embodiment is characterized in that on the basis of an engine state of the printer section 6, which is output from the engine sensor 313, a suitable image process program is input from the external interface 310 and loaded on the external RAM 311.

Figure 9:
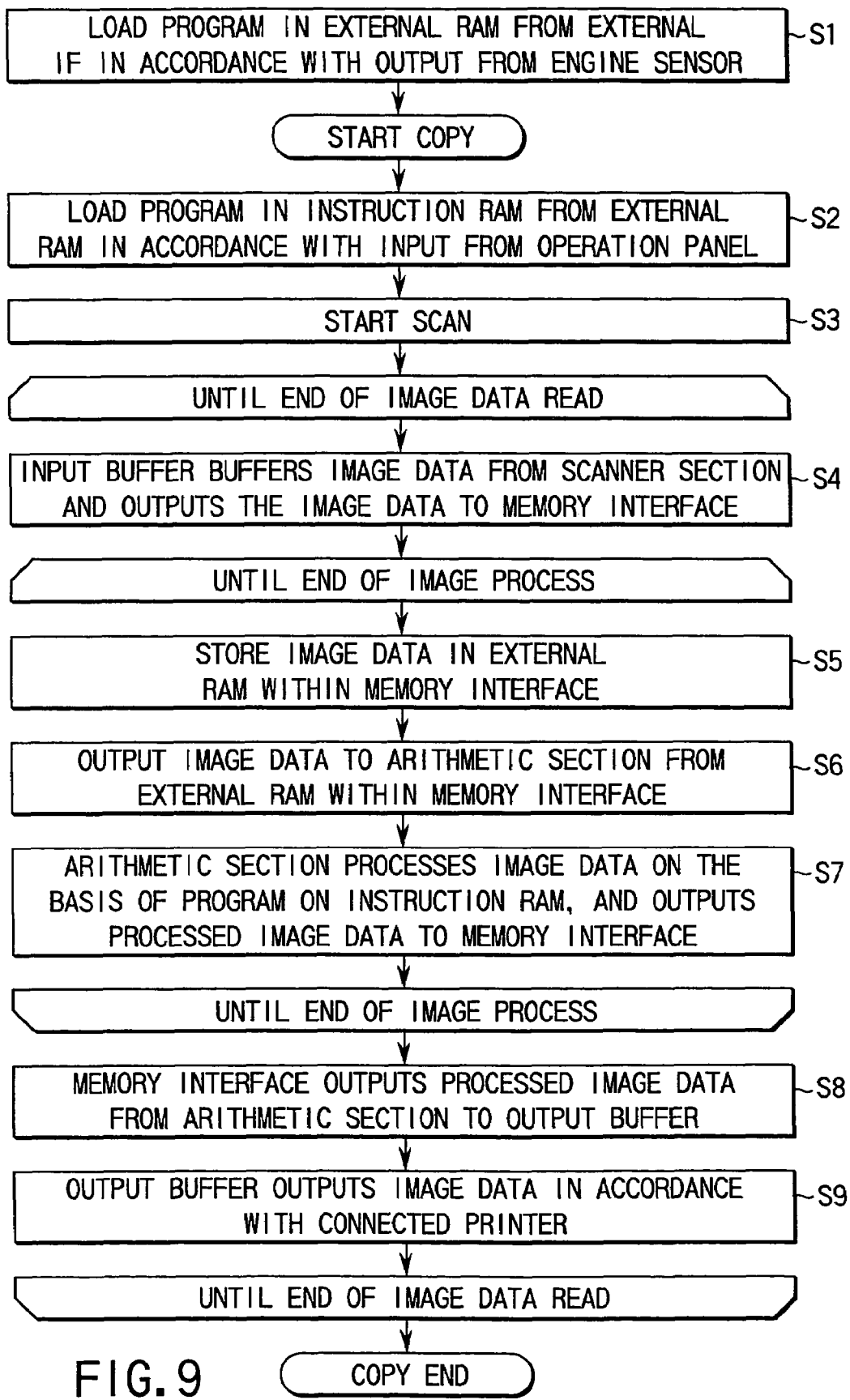
FIG. 9 is a flow chart illustrating an image process in the image process section according to the second embodiment.

As regards the flow of the copying function, the step S1 in the flow chart of FIG. 7 relating to the first embodiment is changed to a step S1, "IN ACCORDANCE WITH ENGINE STATE OUTPUT FROM ENGINE SENSOR 313, SUITABLE IMAGE PROCESS PROGRAM IS LOADED FROM EXTERNAL INTERFACE 310 ONTO EXTERNAL RAM 311," as shown in FIG. 9.

The engine sensor 313 is, for instance, a CCD sensor for reading a test pattern developed on the photosensitive drum, or a temperature/humidity sensor for measuring the temperature/humidity of the engine. For example, if it is determined, from sensor information of the CCD sensor, etc., that the state of the engine has deteriorated and a satisfactory resolution cannot be obtained, an intermediate gray-scale process program with a lowered resolution (e.g. from 600 dpi output to 300 dpi output) is input from the external interface 310 and loaded onto the external RAM 311. Accordingly, this program is used in the subsequent copying operation.

Figure 10:
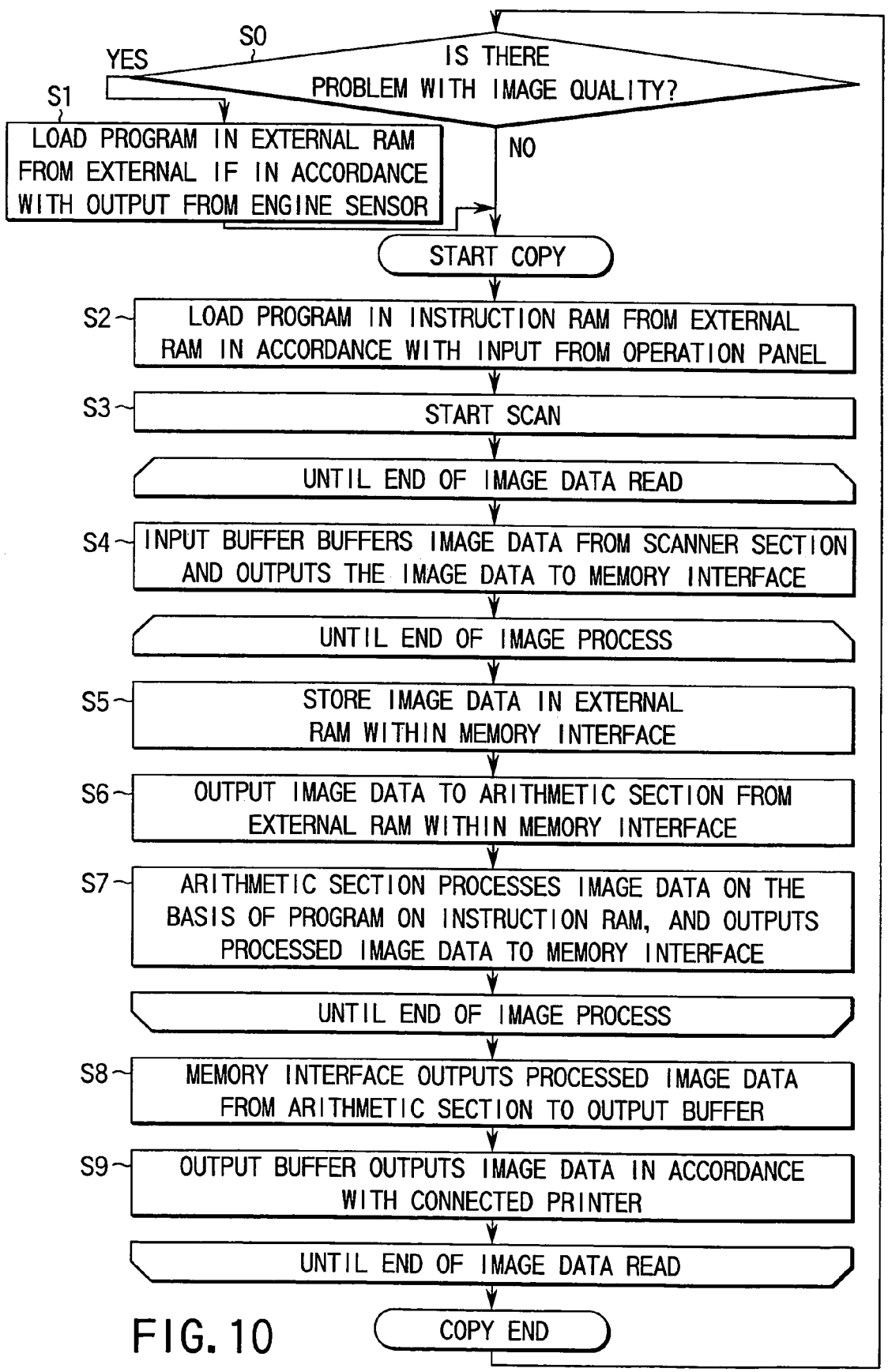
FIG. 10 is a flow chart illustrating an image process in an image process section according to a modification of the second embodiment.

As is illustrated in FIG. 10, a feedback loop for enhancing image quality may be created with the presence of the engine sensor 313. In FIG. 10, steps S2 to S9 are common to those of the above-described embodiment. However, a step S0 is added for determining, based on a sensed result from the engine sensor 313, whether there is a problem with the image quality of an output image from the printer section 6.

If it is determined in step S0 that there is a problem with the image quality of the output image from the printer section 6, a new image process program is input from the external interface 310 and loaded on the external RAM 311 in step S1. On the other hand, if it is determined in step S0 that there is no problem with the image quality, the subsequent copying operation is performed using the current program.

After the completion of the copying operation, the image quality is determined once again by the engine sensor 313. If the image quality has been improved, program reloading from the external interface 310 is not performed. If there is still a problem with image quality, reloading is performed. By repeating the program loading, the image quality can be exactly enhanced.

The structure of the present invention is not limited to the above-described embodiments. This invention is also applicable, for instance, to a digital copying machine having a scanner section composed of a general-purpose scanner and a printer section composed of a general-purpose printer.

As has been described above in detail, according to the first and second embodiments, there is provided an image processing apparatus wherein the image process section is constructed by arithmetic means which is programmed and operated by software, whereby a flexible image process is realized.

In addition, there is provided an image processing apparatus wherein an external interface is provided as a program loader-side element for loading a program onto a small-capacity, high-speed instruction memory, whereby an image process program can be upgraded and various parameters updated after shipment, and thus the image quality can be enhanced progressively.

A third embodiment of the present invention will now be described.

The third embodiment of the invention is characterized in that an image process program is prestored in the external RAM 311 in the memory interface 304.

Figure 11:
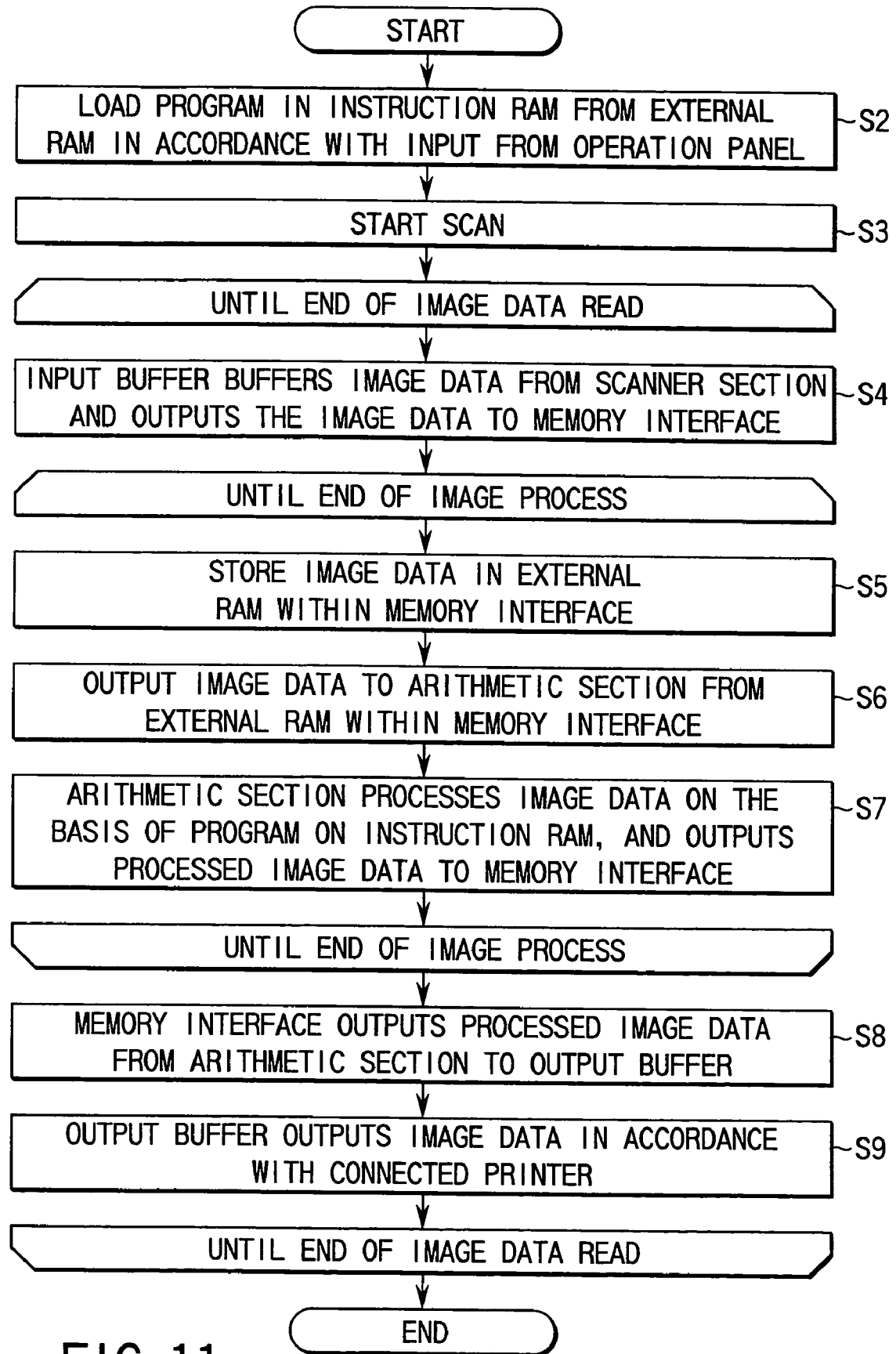
FIG. 11 is a flow chart illustrating an image process in an image process section according to a third embodiment.

In the process for the copying operation, step S1 in the flow chart of FIG. 7 relating to the first embodiment is omitted. Instead, as shown in FIG. 11, on the basis of information input by the user through the operation panel 80, an image process program prestored in the external RAM 311 in the memory interface 304 is selected and loaded on the instruction RAM 308 through the arithmetic section 307.

The structure of the apparatus is the same as that of the first embodiment, and a description thereof is omitted.

An example of the information input by the user in step S2 will now be described. The LCD 82 on the operation panel 80 displays, for instance, three original mode switches for designating original modes of "CHARACTER/PHOTO ORIGINAL", "CHARACTER ORIGINAL" and "PHOTO ORIGINAL". At the time of executing the copying operation, the user selects one of them. Different image process programs are used for the respective original modes. In brief, the following programs are used:

Character/Photo Original: recognition→color conversion→filter process→black-coloring process→error diffusion process;

Character Original: color conversion→filter process→black-coloring process→error diffusion process; and Photo Original: color conversion→filter process→black-coloring process→structure dither process.

Where in step S2 the program corresponding to the original mode is not loaded in the instruction RAM 308 on the basis of this mode information, it is necessary to develop a program which will meet the conditions for the three original modes at the same time, and to load it in the instruction RAM 308. Normally, a high-speed operation memory is used for the instruction RAM 308. However, this memory is expensive and only a memory with a small capacity (e.g. 1024×32 bits) may practically be mounted. It is difficult to develop, with such a small-capacity memory, a program which will meet the conditions for the process speed and image quality in the three original modes.

To solve this problem, in the present embodiment, three image process programs corresponding to the three original modes are prepared in advance in the external RAM 311. In step S2, one of the three image process programs, which corresponds to the original mode, is loaded in the instruction RAM 308 by the operation through the operation panel 80.

Since the whole area of the instruction RAM 308 can be used for each of the original modes, more complex programs can be executed, and the image processing with a satisfactory process speed and image quality can be performed. This is advantageous for effective use of the instruction RAM 308. In addition, when realization of the same function is considered, cost reduction is achieved since the capacity of the expensive, high-speed instruction memory may be small.

A fourth embodiment of the present invention will now be described.

Figure 12:
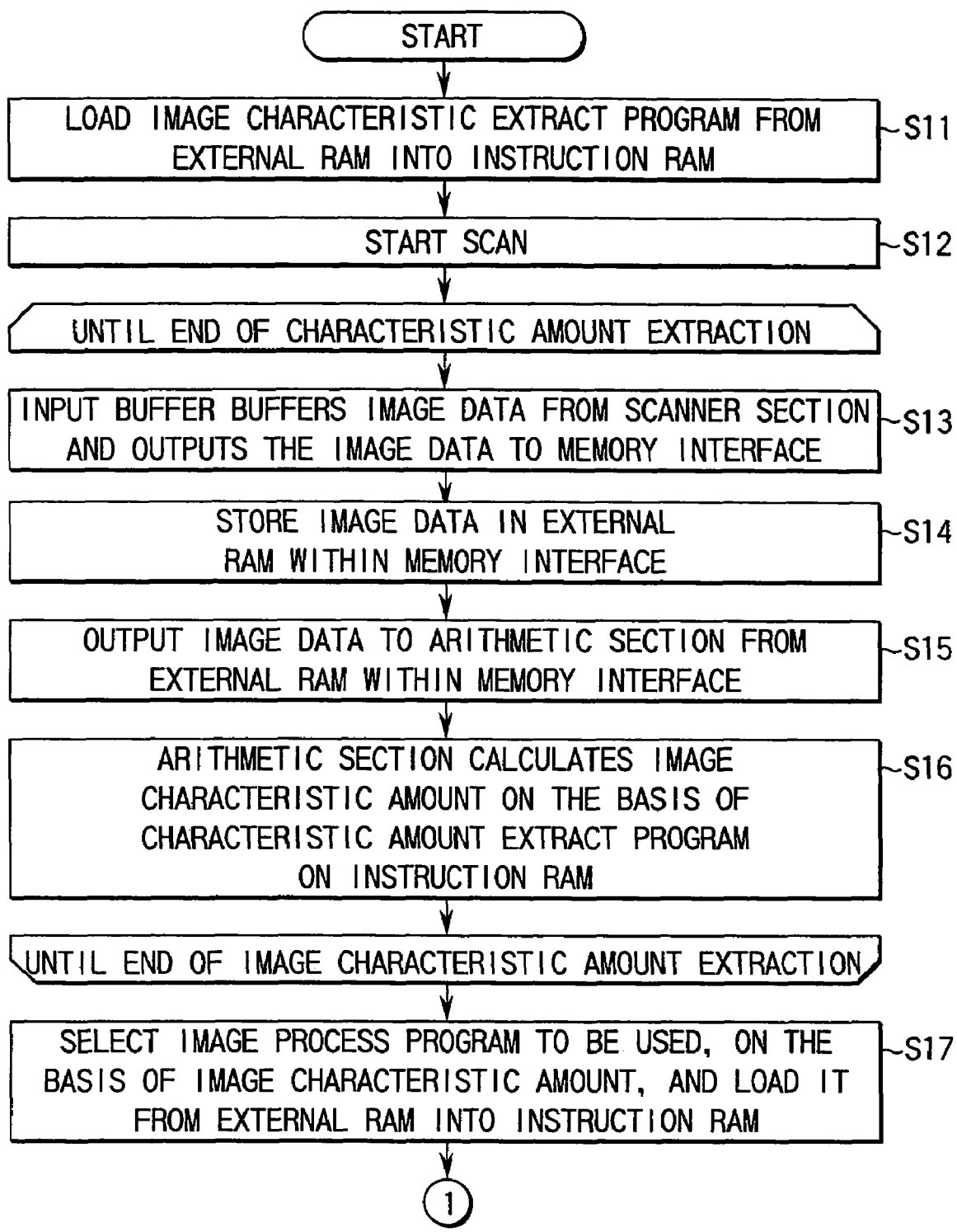
FIG. 12 is a flow chart illustrating an image process in an image process section according to a fourth embodiment.
Figure 13:
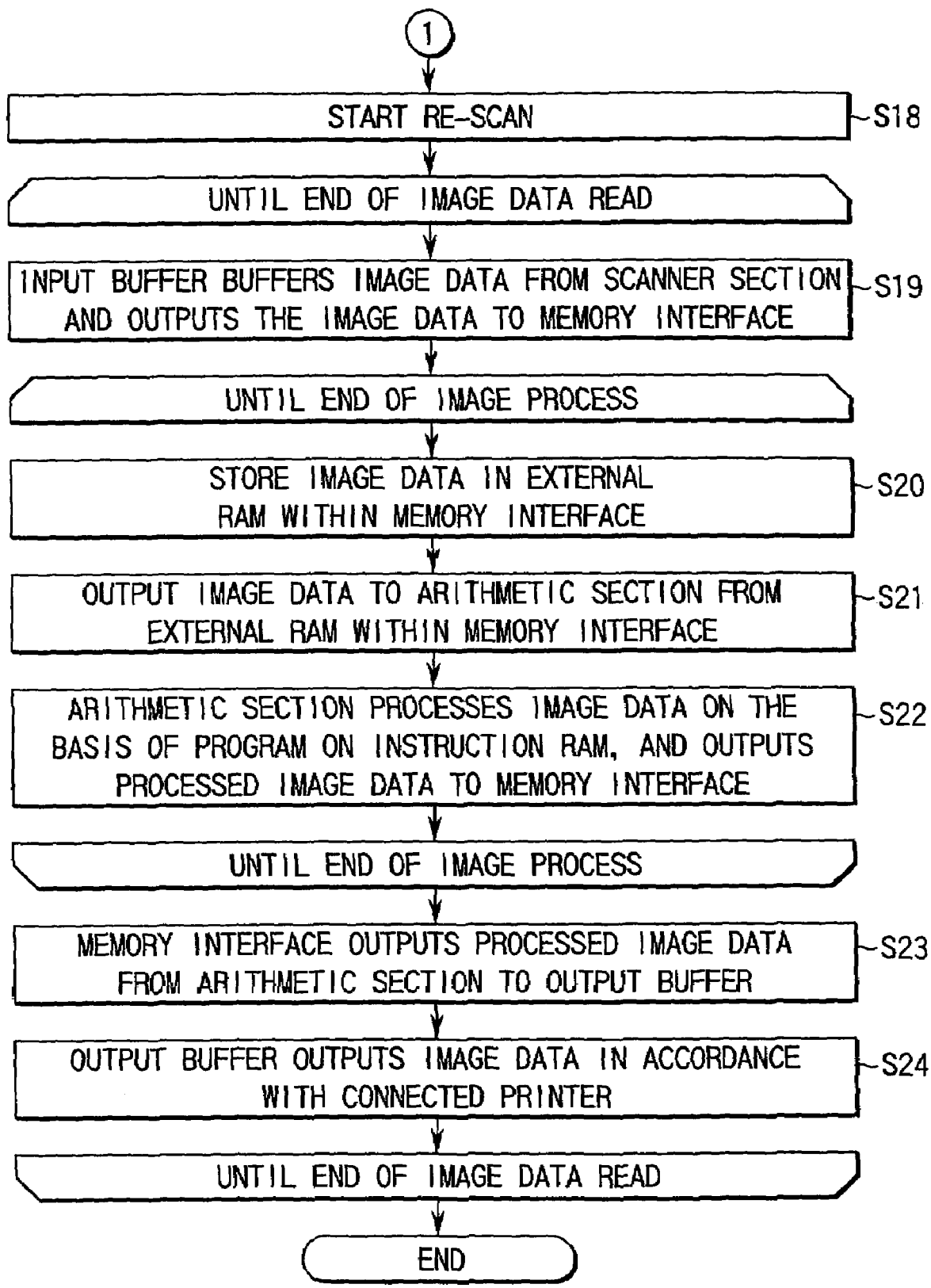
FIG. 13 is a flow chart illustrating an image process in the image process section according to the fourth embodiment.

In the fourth embodiment, to start with, a characteristic amount of an image is calculated by the arithmetic section 307. On the basis of the calculated characteristic amount, a suitable image process program stored in the external RAM in the memory interface 304 is loaded on the instruction RAM 308 via the arithmetic section 307. This process will now be described with reference to flow charts of FIGS. 12 and 13.

The structure of the apparatus according to the fourth embodiment is the same as that in the first embodiment. The process in the fourth embodiment will be described with reference to the structure in the first embodiment, and a description of the structure is omitted here.

Upon start of the copying operation, an image characteristic amount extract program prestored in the external RAM 311 in the memory interface 304 is selected and loaded on the instruction RAM 308 via the arithmetic section 307 (step S11).

Upon a process start instruction from the operation panel 80, the scanner section 4 starts scanning (step S12). Image data scanned by the scanner section 4 is buffered in the input buffer 305 and then delivered to the memory interface 304 (step S13). In the memory interface 304, the image data from the input buffer 305 is stored at a predetermined address position in the external RAM 311 (step S14). The external RAM 311 also stores arithmetic data used in the arithmetic section 307.

The memory interface 304 successively outputs the image data from the external RAM 311 in accordance with a read-out control signal from the arithmetic section 307 (step S15). The arithmetic section 307 processes the image data input from the memory interface 304 on the basis of the image characteristic amount extract program on the instruction RAM 308. The arithmetic section 307 thus calculates the characteristic amount of image (step S16).

After the calculation of the image characteristic amount, the arithmetic section 307 selects, on the basis of the calculated image characteristic amount, a suitable image process program associated with the calculated image characteristic amount, which is prestored in the external RAM 311 in the memory interface 304, and loads it on the instruction RAM 308 (step S17).

Subsequently, the arithmetic section 307 requests the scanner section 4 to start re-scan, and the scanner section 4 starts re-scanning (step S18). Image data re-scanned by the scanner section 4 is buffered in the input buffer 305 and then delivered to the memory interface 304 (step S19). In the memory interface 304, the image data from the input buffer 305 is stored at a predetermined address position in the external RAM 311 (step S20).

The memory interface 304 successively outputs the image data from the external RAM 311 in accordance with a read-out control signal from the arithmetic section 307 (step S21). The arithmetic section 307 processes the image data input from the memory interface 304 on the basis of the image process program on the instruction RAM 308, and returns the processed data as image data to the memory interface 304 (step S22).

In the memory interface 304, the processed image data output from the arithmetic section 307 is stored at a predetermined address in the external RAM 311. From this address, the image data is output to the output buffer 306 (step S23). The output buffer 306 outputs the image data in accordance with the printer section 6 connected thereto (step S24).

The image characteristic amount calculated in step S16 and the image process program loaded in step S17 will now be described by way of example. Consider a density histogram as an example of the image characteristic amount. The density histogram is formed by classifying pixels on a specified region of an image into pixel groups associated with image density areas and counting the number of pixels of each pixel group.

Through the process of steps S11 to S16, the density histogram of the specified region of the image is calculated. In the case of a monochromatic original, the distribution of the density histogram is limited to gray. In the case of a color original, the distribution of the density histogram spreads to all colors. In step S17, a suitable image process program is loaded, depending on whether a monochromatic original or a color original is determined from the density histogram. Examples of such a program are:

Color Original: color conversion→filter process→black-coloring process→structure dither process, Monochromatic Original: monochromatizing process→filter process→error diffusion process→smoothing.

As has been described above, according to the present embodiment, the small-capacity instruction RAM 308 can be efficiently used, and the image process matching with the characteristic of the original can be performed. Therefore, the image quality can be enhanced and the speed of processing increased.

A fifth embodiment of the invention will now be described.

Figure 14:
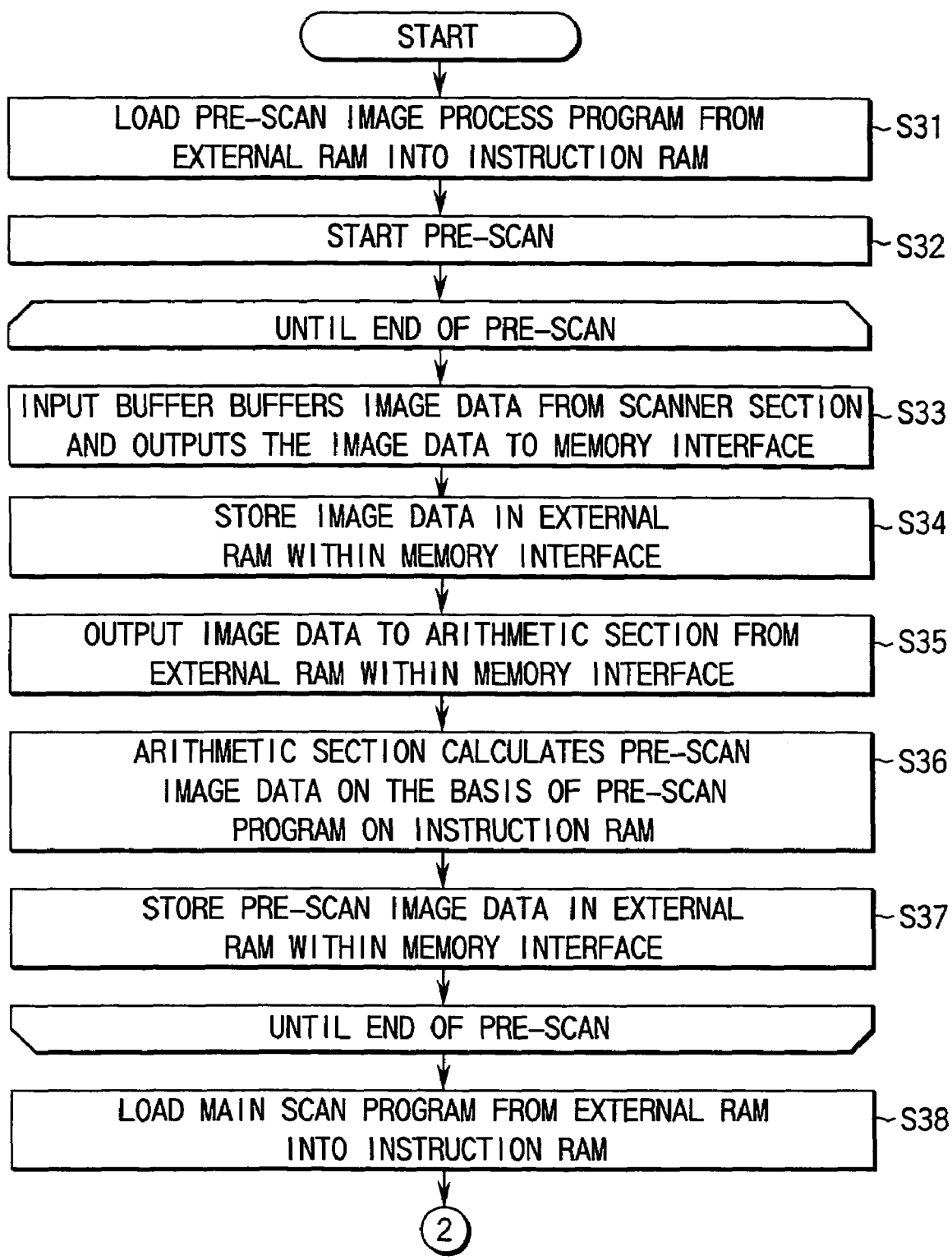
FIG. 14 is a flow chart illustrating an image process in an image process section according to a fifth embodiment.
Figure 15:
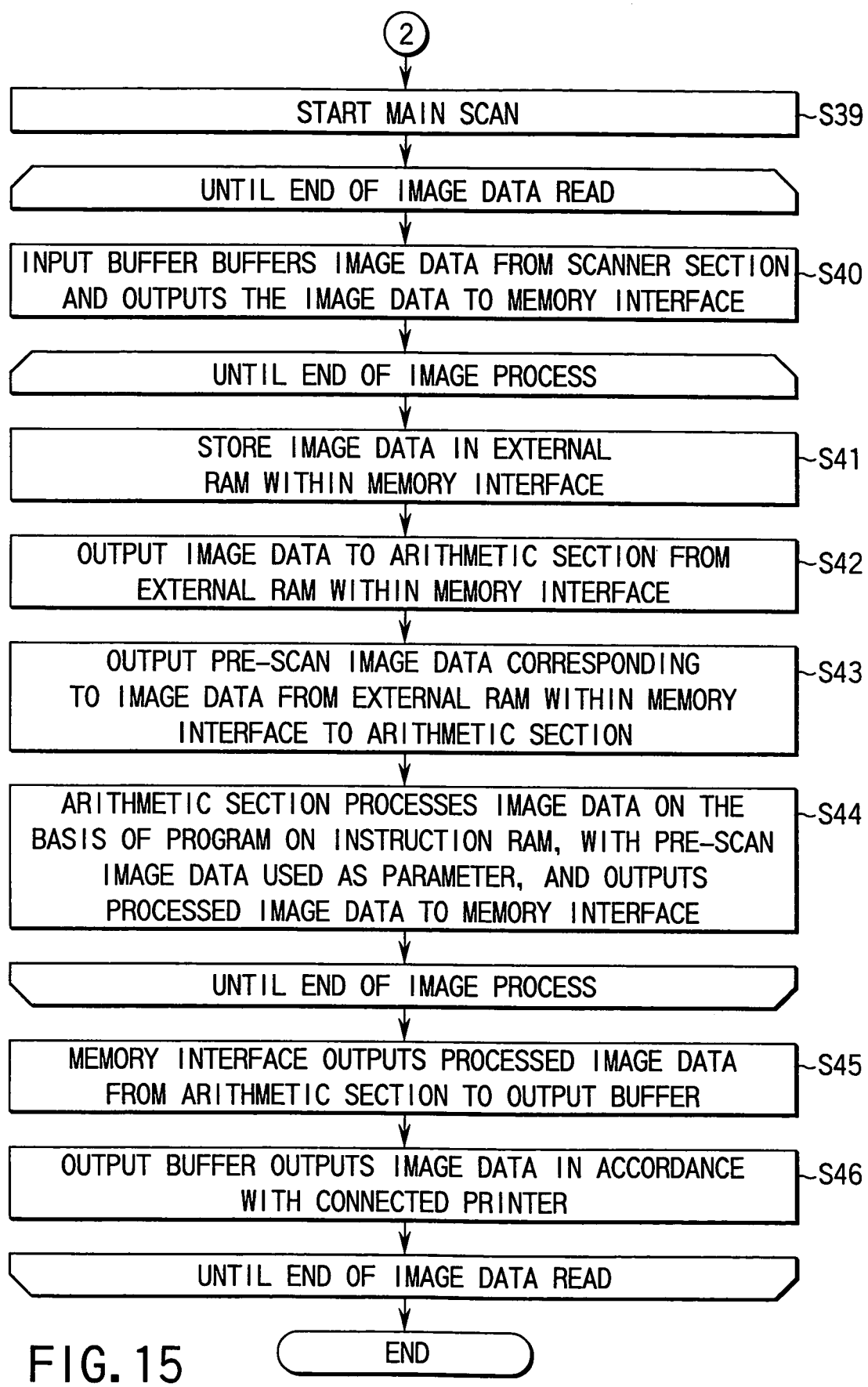
FIG. 15 is a flow chart illustrating an image process in the image process section according to the fifth embodiment.

In the fifth embodiment, the scanner section 4 has a plurality of scan modes such as a pre-scan mode and a main scan mode. When the pre-scan or main scan is performed, an image process program prestored in the external RAM 311 in the memory interface 304 is loaded on the instruction RAM 308 via the arithmetic section 307 in accordance with the selected scan mode. This process will now be described with reference to flow charts of FIGS. 14 and 15.

The structure of the apparatus according to the fifth embodiment is the same as that in the first embodiment. The process in the fifth embodiment will be described with reference to the structure in the first embodiment, and a description of the structure is omitted here.

Upon start of the copying operation, a pre-scan image process program prestored in the external RAM 311 in the memory interface 304 is selected and loaded on the instruction RAM 308 via the arithmetic section 307 (step S31).

Upon a process start instruction from the operation panel 80, the scanner section 4 starts scanning (step S32). Image data scanned by the scanner section 4 is buffered in the input buffer 305 and then delivered to the memory interface 304 (step S33). In the memory interface 304, the image data from the input buffer 305 is stored at a predetermined address position in the external RAM 311 (step S34). The external RAM 311 also stores arithmetic data used in the arithmetic section 307.

The memory interface 304 successively outputs the image data from the external RAM 311 in accordance with a read-out control signal from the arithmetic section 307 (step S35). The arithmetic section 307 processes the image data input from the memory interface 304 on the basis of the pre-scan image process program on the instruction RAM 308 and outputs the processed data to the memory interface 304 as pre-scan image data (step S36).

The memory interface 304 successively stores the processed pre-scan image data from the arithmetic section 307 in the external RAM 311 at predetermined addresses (step S37).

After the end of the pre-scan, the arithmetic section 307 selects a main scan image process program prestored in the external RAM 311 in the memory interface 304, and loads it on the instruction RAM 308 (step S38).

Subsequently, the arithmetic section 307 requests the scanner section 4 to start main scan, and the scanner section 4 starts main scanning (step S39). Image data acquired by the main scan by the scanner section 4 is buffered in the input buffer 305 and then delivered to the memory interface 304 (step S40). In the memory interface 304, the image data from the input buffer 305 is stored at a predetermined address position in the external RAM 311 (step S41).

The memory interface 304 successively outputs the image data from the external RAM 311 in accordance with a read-out control signal from the arithmetic section 307 (step S42). In addition, the memory interface 304 successively outputs the pre-scan image data, which is in the external RAM 311 and corresponds to the currently processed image data, in accordance with a read-out control signal from the arithmetic section 307 (step S43).

The arithmetic section 307 processes the image data and pre-scan data input from the memory interface 304 on the basis of the main scan image process program on the instruction RAM 308, and returns the processed data as image data to the memory interface 304 (step S44).

In the memory interface 304, the processed image data output from the arithmetic section 307 is stored at a predetermined address in the external RAM 311. From this address, the image data is output to the output buffer 306 (step S45). The output buffer 306 outputs the image data in accordance with the printer section 6 connected thereto (step S46).

The pre-scan and main scan image process programs will now be described in brief by way of example. In the pre-scan mode, an original type discrimination program is performed to discriminate whether an original is a character original, a character/photo original or a photo original. On the basis of the discrimination result, an area discrimination program is executed to discriminate a character area and a photo area on the original. As a result of the discrimination, each pixel on the original is classified into a character pixel or a photo pixel, and the classification result is accumulated in the external RAM 311.

In order to increase the processing speed, the pre-scan, in general, is performed with a lower resolution than the main scan (with the scan speed being varied). Since the discrimination program is very complex, the scale thereof is large. This program cannot be stored, along with other programs, in the small-capacity instruction RAM 308.

In the pre-scan mode, only the area discrimination program is loaded on the instruction RAM 308 and it is executed by the arithmetic section 307. The result of the arithmetic process is stored in the external RAM 311. Subsequent to the pre-scan, on the basis of the discrimination result in the external RAM 311, the following image process is carried out in the main scan mode which is suitable for characters and photos:

color conversion→filter process→black-coloring process→error diffusion process.

As has been described above, if the image process program for pre-scan and that for main scan are separated and the programs are loaded according to the procedure of this embodiment, the image process making use of complex discrimination can be realized even with the small-capacity external RAM 308.

A sixth embodiment of the present invention will now be described.

The sixth embodiment differs from the third embodiment in that the engine sensor 313, as shown in FIG. 8, is added as a state sensing means for sensing the engine state of the printer section 6.

The structure of the apparatus according to the sixth embodiment is the same as that in the second embodiment. The process in the fifth embodiment will be described with reference to the structure in the second embodiment, and a description of the structure is omitted here.

Figure 16:
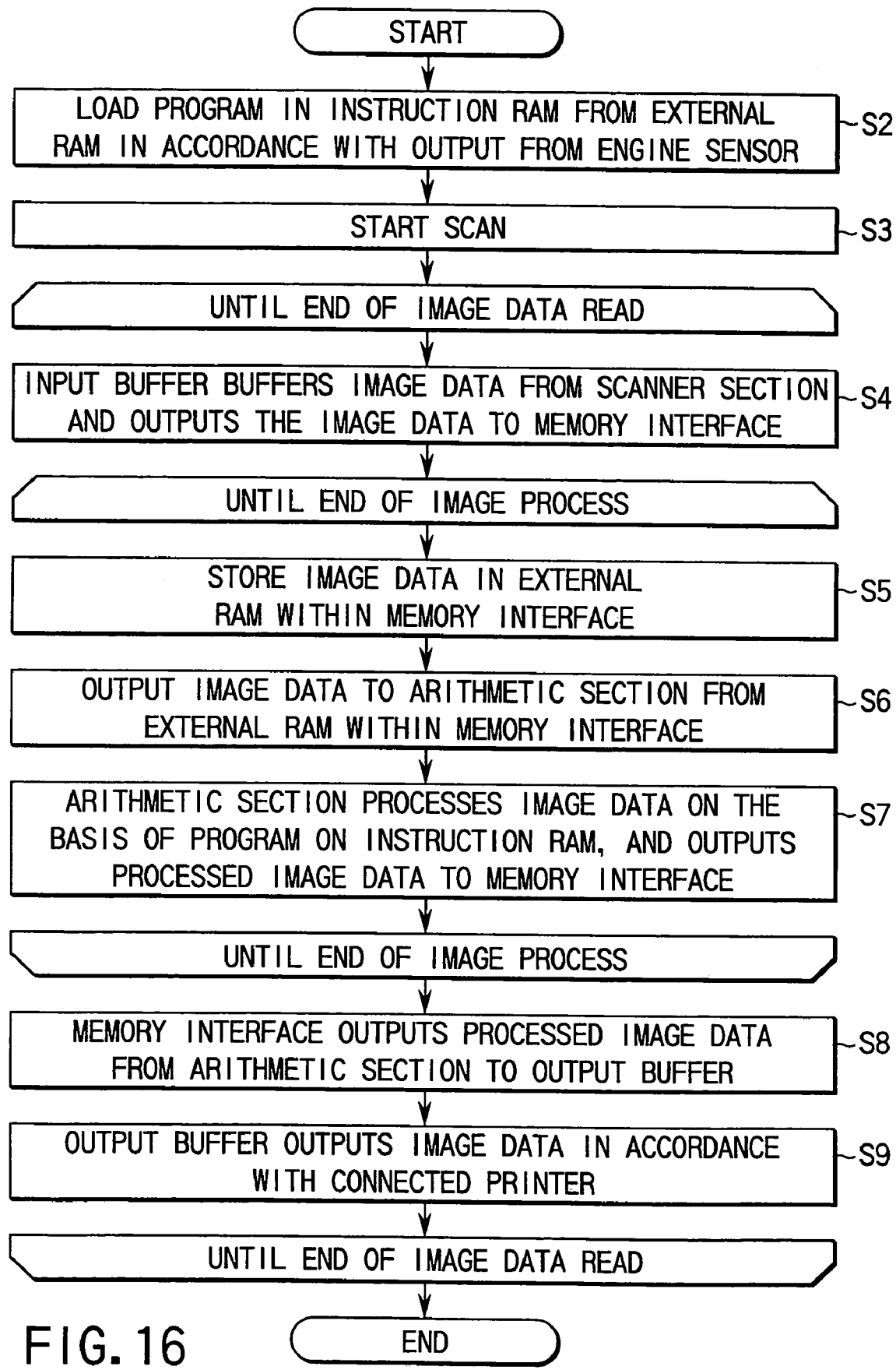
FIG. 16 is a flow chart illustrating an image process in an image process section according to a sixth embodiment.

The sixth embodiment is characterized in that a suitable image process program is loaded from the external RAM 311 onto the instruction RAM 308 on the basis of the data on the engine state of the printer section 6, which is delivered from the engine sensor 313. In the process of the copying operation, the step S2 in the flow chart of FIG. 11 relating to the third embodiment is changed to a step S2, "IN ACCORDANCE WITH ENGINE STATE OUTPUT FROM ENGINE SENSOR 313, SUITABLE IMAGE PROCESS PROGRAM IS LOADED FROM EXTERNAL RAM 311 ONTO INSTRUCTION RAM 3108," as shown in FIG. 16.

The engine sensor 313 is, for instance, a CCD sensor for reading a test pattern developed on the photosensitive drum, or a temperature/humidity sensor for measuring the temperature/humidity of the engine. For example, if it is sensed, from sensor information, e.g. a test pattern, that a γ-characteristic curve (pulse width—density) of the engine is steep, it is determined that the number of gray scale levels is not adequate. Accordingly, an intermediate gray-scale process program with a reduced number of gray scale levels is loaded on the instruction RAM 308.

If the temperature/humidity sensor has sensed a high-temperature/high-temperature state, a laser pulse width select program which reduces a maximum temperature is loaded. If the temperature/humidity sensor has sensed a low-temperature/low-temperature state, a laser pulse width select program which increases a maximum temperature as much as possible is loaded. In addition, a γ-conversion program suitable for each state is loaded.

A seventh embodiment of the present invention will now be described.

In the seventh embodiment, the data on the frequency of use of each image process program loaded on the instruction RAM 308 is stored in the external RAM 311. An image process program with a high frequency of use is loaded prior to the user's operation. After a program load instruction is input through the operation panel 80, non-loaded programs alone will be loaded. Thereby, the time needed for program loading can be shortened, and high-speed processing for the copying operation can be realized.

Figure 17:
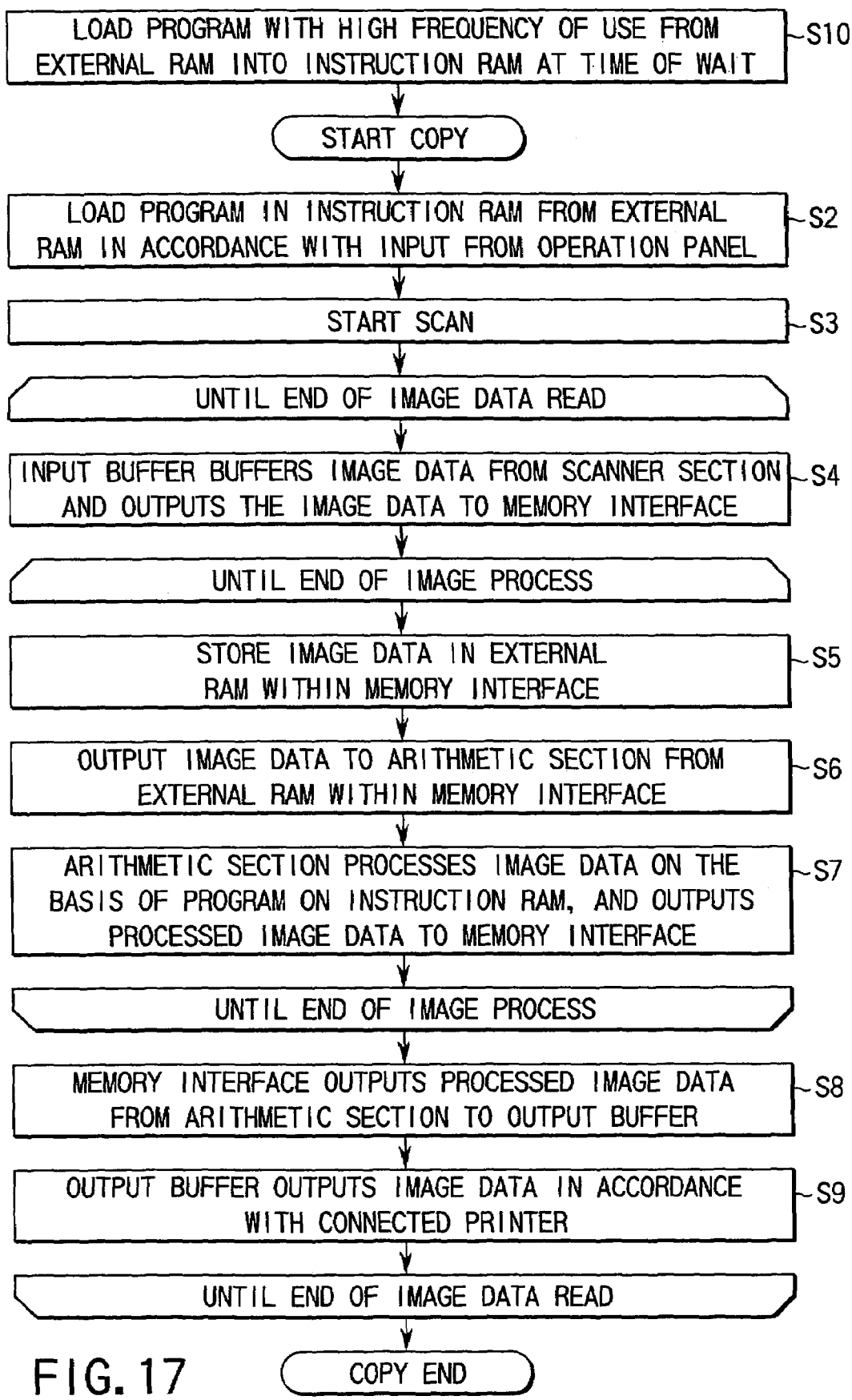
FIG. 17 is a flow chart illustrating an image process in an image process section according to a seventh embodiment.

In the process of the copying operation, a new step S10 as shown in FIG. 17 is added before step S2 in the flow chart of FIG. 11 relating to the third embodiment. Specifically, step S10 is a step of "loading an image process program with a high frequency of use onto the instruction RAM 308 from the external RAM 311 at the time of wait."

Since the structure of the apparatus according to the seventh embodiment is the same as that in the first embodiment, a description of the structure is omitted here.

An eighth embodiment of the invention will now be described.

The structure of the apparatus according to the eighth embodiment is the same as that in the first embodiment. The process in the eighth embodiment will be described with reference to the structure in the first embodiment, and a description of the structure is omitted here.

The eighth embodiment is characterized in that data in the instruction RAM 308 and external RAM 311 is displayed on the LCD 82 of the operation panel 80 in accordance with input information from the operation panel 80. Addresses are assigned to the respective memory areas in the instruction RAM 308 and external RAM 311. If a command, e.g. "DUMP A000 A1000," is input from the operation panel 80, programs and data stored at addresses A000 to A1000 in the instruction RAM 308 are displayed on the LCD 84 of the operation panel 80. With this function, the efficiency of debugging at the time of developing programs is enhanced.

Not only by displaying data, but also by displaying the code of the currently run program on the LCD 84 of operation panel 80, the operation state can be monitored.

Image data input from the scanner section 4 is successively stored in the external RAM 311. If the address of the memory area where the image data is stored is designated (the address is determined from coordinates within the image) and the data associated with the designated address is displayed on the LCD 84 of operation panel 80, the function of the scanner section 4 can be confirmed.

A ninth embodiment of the invention will now be described.

Figure 18:
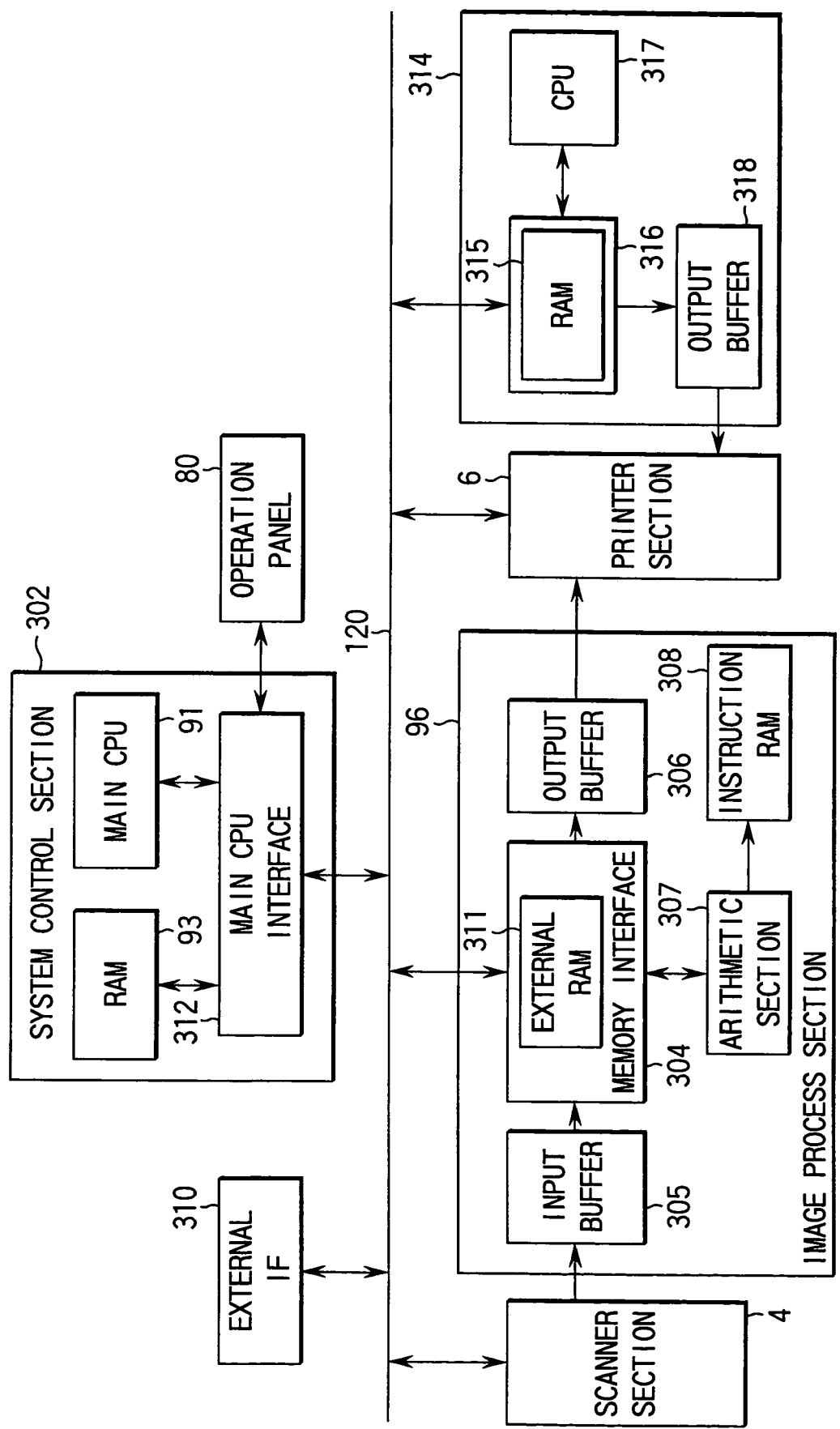
FIG. 18 is a flow chart illustrating an image process in an image process section according to a ninth embodiment.

The ninth embodiment differs from the third embodiment in that an internal information visualizing section (e.g. RIP: Raster Image Processor) 314 is added as information visualizing means for making internal information visible, as shown in FIG. 18. In the other respects, both embodiments are common, and a description of common portions is omitted.

The ninth embodiment is characterized in that information in the instruction RAM 308 and external RAM 311 is visualized by the internal information visualizing section 314 in accordance with an instruction from the operation panel 80, and the visualized information is printed out from the printer section 6.

The internal information visualizing section 314 is connected to the shared bus 120 and comprises a memory interface 316 having an internal RAM 315, a CPU 317 for performing an arithmetic process for visualization, and an output buffer 318 for outputting visualized information to the printer section 6. The RAM 315 stores visualizing process programs for visualizing data in the instruction RAM 308 and external RAM 311.

The visualizing process programs include programs for converting data to character codes and converting numerical data to graphs. For instance, a graph, as shown in FIG. 19, can be obtained by visualizing γ data for γ conversion in the instruction RAM 308 through the internal information visualizing section 314 and printing out the visualized data through the printer section 6. Thereby, the state of settings can be easily understood at the time of debugging or maintenance, and the work efficiency is greatly enhanced.

Needless to say, the internal information visualizing section 314 may be replaced with the arithmetic section 307, external RAM 311, output buffer 306, etc. in the image process section 96.

As has been described above in detail, according to the third to ninth embodiments, there can be provided an image processing apparatus wherein attention is paid to the fact that a necessary image process and an unnecessary image process can be determined on the basis of input information, such as an image copy mode, designated by the user through the operation panel. According to the input information, a suitable image process program alone is loaded. Thereby, small-capacity, high-speed memory device can be efficiently utilized.

Moreover, there can be provided an image process apparatus wherein attention is paid to the fact that whether an original is a character original or a pictorial original can be determined on the basis of a characteristics amount (e.g. histogram) of the image and thus a necessary image process and an unnecessary image process can be determined according to the characteristic amount of the image. According to the characteristic amount of image, a suitable image process program is loaded. Thereby, small-capacity, high-speed memory device can be efficiently utilized.

Furthermore, there can be provided an image process apparatus wherein attention is paid to the fact that an image process program to be used is specified according to the scan mode at the time of scanning by the image input means. According to the scan mode, a suitable image process program alone is loaded. Thereby, small-capacity, high-speed memory device can be efficiently utilized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method of an image processing device comprising an image input means configured to input an image data of a document, image process means configured to subject an image data input by the image input means to a predetermined image process, first program storage means configured to store an image process program for performing an image process to be executed by the image process means, second program storage means configured to store an externally provided image process program supplied, and image output means configured to output an image processed by the image process means, the method comprising:

detecting a state of the image output means;
   determining image quality of an image output by the image output means, on the basis of the detection result;
   inputting an externally provided new image process program when the image quality of the output image is determined to have a problem, the new image process program being based on the detection result;
   storing the input image process program in the second program storage means; and
   reading out a desired image process program from the second program storage means and loading the read image process program in the first program storage means, on the basis of information input from outside.

2. An image processing apparatus comprising:
   an image input section configured to input an image data of a document;
   a first buffer configured to temporarily store an image data input by the image input section;
   an operation section configured to perform a predetermined image processing operation with respect to an image data output by the first buffer;
   a program storage section configured to store an operation program for performing an image process executed by the operation section;
   a second buffer configured to temporarily store an image processed by the operation section;
   an image output section configured to output an image data output from the second buffer;
   a memory interface connected to the first buffer, the operation section and the second buffer and enabling data to be exchanged among the first buffer, the operation section and the second buffer, the memory interface having a storage section in which an operation program for performing an image process is stored in advance;
   a calculation section configured to calculate a density histogram of an image data input by the image input section; and
   a program load section configured to read out an optimal operation program from the storage section of the memory interface and load the optimal operation program in the program storage section, on the basis of a density histogram of an image data calculated by the calculation section.

3. An image processing apparatus comprising:
   an image input section having a pre-scan mode and a book-scan mode, and configured to input an image data of a document using the scanning modes;
   a first buffer configured to temporarily store an image data input by the image input section;
   an operation section configured to perform a predetermined image process operation with respect to an image data output by the first buffer;
   a program storage section configured to store an operation program for performing an image processing executed by the operation section;
   a second buffer configured to temporarily store an image processed by the operation section;
   an image output section configured to output an image data processed by the operation section;
   a memory interface connected to the first buffer, the operation section and the second buffer, and enabling data to be exchanged among the first buffer, the operation section and the second buffer, the memory interface having a storage section in which an operation program for performing an image process is stored in advance;
   an image feature identification section configured to identify whether the document is a document configured of characters only, a document configured of characters and a photograph or a document configured of a photograph only, on the basis of an image data input by the pre-scan mode of the image input section; and
   a program load section configured to read out an optimal operation program from the storage section of the memory interface and loading the optimal operation program in the program storage section, on the basis of the identification result of the image characteristic identification section.

* * * * *